(12) United States Patent
Kawaguchi

(10) Patent No.: US 7,810,146 B2
(45) Date of Patent: Oct. 5, 2010

(54) SECURITY DEVICE, TERMINAL DEVICE, GATE DEVICE, AND DEVICE

(75) Inventor: Kyoko Kawaguchi, Tokyo (JP)

(73) Assignee: Panasonic Corporation, Osaka (JP)

( * ) Notice: Subject to any disclaimer, the term of this patent is extended or adjusted under 35 U.S.C. 154(b) by 1103 days.

(21) Appl. No.: 10/597,488

(22) PCT Filed: Jan. 28, 2005

(86) PCT No.: PCT/JP2005/001232

§ 371 (c)(1),
(2), (4) Date: Jul. 27, 2006

(87) PCT Pub. No.: WO2005/073843

PCT Pub. Date: Aug. 11, 2005

(65) Prior Publication Data

US 2008/0289018 A1    Nov. 20, 2008

(30) Foreign Application Priority Data

Jan. 28, 2004  (JP) ............................. 2004-019461

(51) Int. Cl.
*G06F 7/04* (2006.01)
*G06F 17/30* (2006.01)
*G06F 15/16* (2006.01)
*H04L 29/06* (2006.01)

(52) U.S. Cl. ............................................. 726/9; 726/2
(58) Field of Classification Search ...................... 726/7, 726/9

See application file for complete search history.

(56) References Cited

U.S. PATENT DOCUMENTS 6,496,979 B1 *  12/2002  Chen et al. .................. 717/178

7,558,953 B2 *  7/2009  Osthoff et al. .............. 713/161
2002/0066042 A1 *  5/2002  Matsumoto et al. ......... 713/202

(Continued)

FOREIGN PATENT DOCUMENTS

CA    2106122    3/1994

(Continued)

OTHER PUBLICATIONS

English Language Abstract of JP 2003-076958.

*Primary Examiner*—Shin-Hon Chen
(74) *Attorney, Agent, or Firm*—Greenblum & Bernstein, P.L.C.

(57) ABSTRACT

There are provided a secure device, a gate device, and a device providing a secure device such as an IC card capable of limiting an area where the card application function and the device function are realized. The secure device (20) includes: an authentication application (24) for performing authentication of a gate device (40); a terminal application/setting instruction (26) and a terminal application (27) installed in a mobile telephone (10) as a terminal; and a CPU (23) as control means for installing the terminal application specified by the gate device (40) in the mobile telephone (10) when authentication application (24) has successfully authenticated the gate device (40). The secure device (20) is held over the gate device (40) and only in the area where normally passed, the terminal application/setting instruction (26) and the terminal application (27) are installed in the mobile telephone (10). Since the gate application (43) of the gate device (40) specifies an application which functions in a particular area, a user need not perform registration operation. Moreover, there is no need of mounting a GPS receiver or the like onto the terminal.

16 Claims, 38 Drawing Sheets

U.S. PATENT DOCUMENTS

| | | | |
|---|---|---|---|
| 2003/0181219 A1* | 9/2003 | Huang | 455/558 |
| 2004/0002943 A1* | 1/2004 | Merrill et al. | 707/1 |
| 2004/0015694 A1* | 1/2004 | DeTreville | 713/172 |
| 2004/0078565 A1* | 4/2004 | Hofmeister et al. | 713/156 |
| 2004/0097217 A1* | 5/2004 | McClain | 455/411 |

FOREIGN PATENT DOCUMENTS

| | | |
|---|---|---|
| JP | 6-119265 | 4/1994 |
| JP | 6-187163 | 7/1994 |
| JP | 7-200756 | 8/1995 |
| JP | 2003-076958 | 3/2003 |
| JP | 2003-281587 | 10/2003 |

* cited by examiner

FIG. 2

AUTHENTICATION INFORMATION DB

| GATE APPLICATION ID | AUTHENTICATION INFORMATION | TERMINAL APPLICATION ID, SETTING INSTRUCTION ID FOR WHICH INSTALLATION IS POSSIBLE |
|---|---|---|
| www.app.co.jp/gate1 | | TERMINAL APPLICATION 1 ID<br>TERMINAL APPLICATION 2 ID<br>SETTING INSTRUCTION 5 ID |
| | | |

AUTHENTICATION INFORMATION DB

| APPLICATION ID | AUTHENTICATION INFORMATION | CARD APPLICATION ID FOR WHICH PIN SETTING IS POSSIBLE | CARD APPLICATION ID FOR WHICH PIN SETTING CAN BE RELEASED |
|---|---|---|---|
| www.app.co.jp/gate1 | | CARD APPLICATION 1 ID<br>CARD APPLICATION 2 ID | CARD APPLICATION 3 ID<br>CARD APPLICATION 4 ID |
| | | | |
| | | | |

FIG. 6

| APPLICATION ID | CARD APPLICATION ID FOR WHICH PRIORITY SETTING IS POSSIBLE | CARD APPLICATION ID FOR WHICH PRIORITY SETTING CAN BE RELEASED |
|---|---|---|
| www.app.co.jp/gate1 | GATE APPLICATION 1 ID GATE APPLICATION 2 ID | GATE APPLICATION 3 ID GATE APPLICATION 4 ID |
| | | |
| | | |

FIG. 8

| APPLICATION ID | PRIORITY TEMPLATE CAPABLE OF BEING SET | PRIORITY TEMPLATE CAPABLE OF BEING RELEASED |
|---|---|---|
| www.app.co.jp/gate1 | ID OF TEMPLATE 1<br>ID OF TEMPLATE 2 | ID OF TEMPLATE 3 |
| | | |
| | | |

FIG.9A

| PRIORITY TEMPLATE ID | 5 |
|---|---|
| PRIORITY 1 | ID OF CARD APPLICATION 1 |
| PRIORITY 2 | ID OF CARD APPLICATION 3 |

FIG.9B

| ID | GATE APPLICATION ID | COMMUNICATION SCHEME | AUTHENTICATION INFORMATION | TERMINAL APPLICATION SETTING INSTRUCTIONS ID FOR WHICH INSTALLATION IS POSSIBLE | TERMINAL APPLICATION SETTING INSTRUCTIONS ID TO BE DELETED |
|---|---|---|---|---|---|
| 1 | www.app.co.jp/gate1 | INDEPENDENT COMMUNICATION SCHEME A | | TERMINAL APPLICATION ID (MAILER FOR INDIVIDUAL USE) TERMINAL APPLICATION 2 ID (GAME) SETTING INSTRUCTION 5 ID (INDIVIDUAL NETWORK SETTING, WALLPAPER, NORMAL CALLING MODE) | TERMINAL APPLICATION 3 ID (EXTENSION NUMBER VIEWING BROWSER) SETTING INSTRUCTION 7 ID (SETTING FOR COMPANY USE : COMPANY NETWORK SETTING, WALLPAPER, EXTENSION MODE) |
| 2 | www.app.co.jp/gate1 | INDEPENDENT COMMUNICATION SCHEME B | | TERMINAL APPLICATION ID (MAILER FOR COMPANY USE) TERMINAL APPLICATION 3 ID (EXTENSION NUMBER VIEWING BROWSER) SETTING INSTRUCTION 7 ID (SETTING FOR COMPANY USE : COMPANY NETWORK SETTING, WALLPAPER, EXTENSION MODE) | TERMINAL APPLICATION ID (MAILER FOR INDIVIDUAL USE) TERMINAL APPLICATION 2 ID (GAME) SETTING INSTRUCTION 5 ID (INDIVIDUAL NETWORK SETTING, WALLPAPER, NORMAL CALLING MODE) |

FIG.27

| COMMUNICATION SCHEME | AUTHENTICATION INFORMATION | APPLICATION ID TO BE INVALIDATED |
|---|---|---|
| ISO 14443 TYPE B | | CARD APPLICATION 3 ID (CREDIT CARD) |
| ISO 14443 TYPE A | | CARD APPLICATION 1 ID (DRIVING LICENCE) |
| JICSAP2.0 HIGH-SPEED COMMAND SPECIFICATION | | CARD APPLICATION 3 ID (CREDIT CARD) |

| ID | GATE APPLICATION ID | COMMUNICATION SCHEME | AUTHENTICATION INFORMATION | EFFECTIVE TIME | TERMINAL APPLICATION SETTING INSTRUCTIONS ID FOR WHICH INSTALLATION IS POSSIBLE | TERMINAL APPLICATION SETTING INSTRUCTIONS ID TO BE DELETED |
|---|---|---|---|---|---|---|
| 1 | www.app.co.jp/gate1 | ISO14 443typeB | | 5:00 | TERMINAL APPLICATION 3 ID (EXTENSION NUBER VIEWING BROWSER) SETTING INSTRUCTION 7 ID (SETTING FOR COMPANY USE COMPANY NETWORK SETTING, WALLPAPER, EXTENSION MODE) | TERMINAL APPLICATION 2 ID (GAME) SETTING INSTRUCTION 5 ID (INDIVIDUAL NETWORK SETTING, WALLPAPER, NORMAL CALLING MODE) |
| 2 | www.app.co.jp/gate2 | UWB | | NO LIMIT | TERMINAL APPLICATION 2 ID (GAME) SETTING INSTRUCTION 5 ID (INDIVIDUAL NETWORK SETTING, WALLPAPER, NORMAL CALLING MODE) | TERMINAL APPLICATION 3 ID (EXTENSION NUBER VIEWING BROWSER) SETTING INSTRUCTION 7 ID (SETTING FOR COMPANY USE COMPANY NETWORK SETTING, WALLPAPER, EXTENSION MODE) |

FIG.33

EXAMPLE OF DATA STORED IN 8-14 OF FIG.34:

| ID | EQUIPMENT 3 ID | GATE APPLICATION ID | EQUIPMENT 1 ID | TIME STAMP AT TIME OF SETTING | EFFECTIVE TIME | ID OF AUTHENTICATION SETTING DB | INSTALLED TERMINAL APPLICATION ID | INSTALLED SETTING INSTRUCTION ID | DELETED TERMINAL APPLICATION ID | DELETED SETTING APPLICATION ID | SETTING PROCESSING RESULTS |
|---|---|---|---|---|---|---|---|---|---|---|---|
| 1 | www.app.co.jp/gateterminal1 | www.app.co.jp/gateappl1 | www.app.co.jp/terminal1 | 2004/12/24 15:32:02 | 5:00 | 1 | TERMINAL APPLICATION 3 ID (EXTENSION NUMBER VIEWING BROWSER) | SETTING INSTRUCTION 7 ID (SETTING FOR COMPANY USE:COMPANY NETWORK SETTING, WALLPAPER, EXTENSION MODE) | TERMINAL APPLICATION 2 ID (GAME) | SETTING INSTRUCTIONS 5 ID (INDIVIDUAL NETWORK SETTING, WALLPAPER, NORMAL CALLING MODE) | NORMAL |

EXAMPLE OF DATA STORED IN 8-20 OF FIG.34:

| TIME STAMP AT TIME OF RESTORATION NOTIFICATION | RESTORATION PROCESSING RESULTS |
|---|---|
| 2004/12/24 23:32:02 | NORMAL |

SECURITY DEVICE, TERMINAL DEVICE, GATE DEVICE, AND DEVICE

TECHNICAL FIELD

The present invention relates to a secure device such as an IC card, terminal apparatus, gate equipment, and equipment for carrying out contact communication or non-contact communication with this secure device.

BACKGROUND ART

In recent years, IC cards have been broadly utilized as electronic settlement cards, commuter tickets, event tickets, and credit cards, etc. Recently, coupled with the increase in ever more miniaturized technology, IC cards having comparatively large capacity storage space are being made. It is then possible for this kind of card to be used as a multi-application card so that a single card is compatible with a plurality of applications by storing a plurality of card applications executing card services.

There are two communication schemes for such IC cards, contact communication where contact is made with the reader/writer at electrical contact points of the IC card and recording information is read out, and non-contact communication where information is exchanged by wireless communication where physical contact with a reader/writer is not necessary. In recent years, IC cards (combination cards) capable of being used for both contact communication and non-contact communication have been mounted on mobile terminal apparatus, with these mobile terminals being used as electronic wallets or in place of commuter passes.

Mobile terminal apparatus capable of rapidly and easily selecting target card functions from mounted multimedia cards are disclosed in the following Patent Document 1. Users using the apparatus display card functions of the multi-application card on a display screen of the mobile terminal as a list, and register new applications from this list and applications (priority applications) associated with the new applications for storage in the multi-application card. For example, when a commuter ticket function is registered as a parent application and an electronic money manager function is registered as a priority application, the mobile terminal is held out to the automatic ticket gate, and when it is wished to enter within the station using the commuter ticket function of the multi-application card, an application selection screen is displayed at the display screen of the mobile terminal with the display order of the electronic money function of the priority application set at the highest order.

Further, when the user uses an application function for the multi-application card, this position is detected by a current position detection section such as a GPS receiver etc. for the mobile terminal and the relationship between the used application function and the used position is stored in the mobile terminal. When the vicinity of this position is then arrived at again, an application selection screen where the display order of the application function corresponding to this position is set to the highest order is displayed at the display screen of the mobile terminal.

Patent Document 1: Japanese Patent Application Laid-open No. 2003-76958

DISCLOSURE OF INVENTION

Problems to be Solved by the Invention

In this way, changing the display of the application select screen so as to correspond to this location is disclosed in Patent Document 1 but the conceptualization of limiting the card functions of an IC card depending on the location is not shown in this document. If it is possible to limit the card functions of the IC card depending on the location, new applications are then possible such as, for example, using a mobile telephone mounted with an IC card as an internal telephone within a company area or only utilizing specific data stored in an IC card within a company area, etc.

Further, in the event of limiting the card functions of the IC card according to the location, as shown in Patent Document 1, a user registration operation is necessary. This places a large processing load on the user and also causes the cost of the mobile terminal to increase because it is necessary for the mobile terminal to have a position information acquiring section.

In order to resolve these problems of the related art, it is the object of the present invention to provide a secure device such as an IC card capable of changing the card function of the secure device or the function of terminal apparatus or equipment to correlate with location or change these functions according to the communication scheme, processing that was nullified on the previous occasion, or memory capacity etc., as well as providing terminal apparatus, gate equipment, and equipment carrying out processing in cooperation with this secure device.

Means for Solving the Problem

The security device of the present invention comprises an authentication section that performs authentication processing for a gate equipment, a terminal application installed at a terminal, and a control section that installs the terminal application designated by the gate equipment on the terminal in the event that authentication between the authentication section and the gate equipment is successful.

The secure device of the present invention adopts a configuration comprising an authentication section performing authentication processing for gate equipment, a card application, and a control section that permits the card application designated by the gate equipment to access a terminal application of a terminal in the event of successful authentication of the authentication section with the gate equipment.

Further, the secure device of the present invention adopts a configuration comprising an authentication section carrying out authentication processing with respect to a gate equipment and registering identification information for the successfully authenticated gate equipment, and a card application sending the identification information for the gate equipment to an equipment carrying out a predetermined operation under the condition that the authentication section successfully performs authentication with the gate equipment in order to provide verification of the equipment, or verifying the identification information in place of the equipment.

Further, gate equipment of the present invention adopts a configuration comprising a communication section that communicates with a secure device or a terminal holding the secure device, and a gate application carrying out authentication processing with the secure device via the communication section, and designating a terminal application to be installed at the terminal for the successfully authenticated secure device.

Moreover, gate equipment of the present invention adopts a configuration comprising a communication section that communicates with a secure device or a terminal holding the secure device, and an application carrying out authentication processing with the secure device via the communication section, and designating a card application capable of being accessed by the terminal application of the terminal for the successfully authenticated secure device.

Further, terminal apparatus of the present invention adopts a configuration where a secure device is held, and a terminal application designated by a gate equipment is installed from the secure device successfully authenticated with the gate equipment.

Further, the terminal apparatus of the present invention adopts a configuration holding a secure device, provided with a terminal application accessing a card application designated by a gate equipment in the card application held by the secure device successfully authenticated with the gate equipment.

Equipment of the present invention adopts a configuration of acquiring identification information for a gate equipment from a secure device successfully authenticated with the gate equipment and carrying out a predetermined operation in the event that verification of the identification information is successful.

The equipment of the present invention also adopts a configuration carrying out a predetermined operation in the event that information is acquired indicating successful verification of identification information of a gate equipment from a secure device successfully authenticated with the gate equipment.

Advantageous Effect of the Invention

By working in unison and changing card functions of a secure device and functions of terminal apparatus or equipment to correlate with location, or making changes according to the communication scheme, invalidation processing for a previous time, and memory capacity etc., it is possible for the secure device, gate equipment, terminal apparatus and equipment of the present invention to ensure greater security. For example, by switching over functions of terminal apparatus within an office and outside, it is possible to limit specific processing functions to specific areas, and if a specific entrance is not entered from, it is possible to ensure that the doors of rooms and safes cannot be opened. Further, it is possible to implement this kind of processing without inviting a user processing load or cost load.

BRIEF DESCRIPTION OF THE DRAWINGS

FIG. 2 is a view showing a data configuration for data DE set in Embodiment 1 of the present invention;

FIG. 6 is a view showing a data configuration for data DB set in Embodiment 2 of the present invention;

FIG. 8 is a view showing a data configuration for a priority setting DB of Embodiment 2 of the present invention;

FIG. 9A is a view showing an example of a priority template defining priority of each card application ID for a further data configuration of priority setting DB of Embodiment 2 of the present invention;

FIG. 9B is a view showing an example of a priority setting DB setting a priority template corresponding to a gate application ID for a further data configuration of priority setting DB of Embodiment 2 of the present invention;

FIG. 27 is a view showing an example of an authentication information DE taking the example of processing of entry and exit to and from a company of Embodiment 5;

FIG. 29 is a view showing an example of content of an authentication information DE of Embodiment 6;

FIG. 32 is a view showing an example of data set in the authentication information DB of Embodiment 7;

FIG. 33 is a view showing an example of data set in the terminal setting management section of Embodiment 7;

BEST MODE FOR CARRYING OUT THE INVENTION

Embodiment 1

Embodiment 1 of the present invention is now described for the case where terminal applications stored in an IC card are installed in a terminal only when an IC card at a secure device is positioned in a specific area.

There is a gate at the entrance to this specific area, and when authentication processing with the IC card is successful, the gate application designates a terminal application to be set to the terminal at the IC card. Upon receiving this, at an appropriate time, the IC card installs the designated terminal application from the held terminal applications to the terminal.

Figure 1:
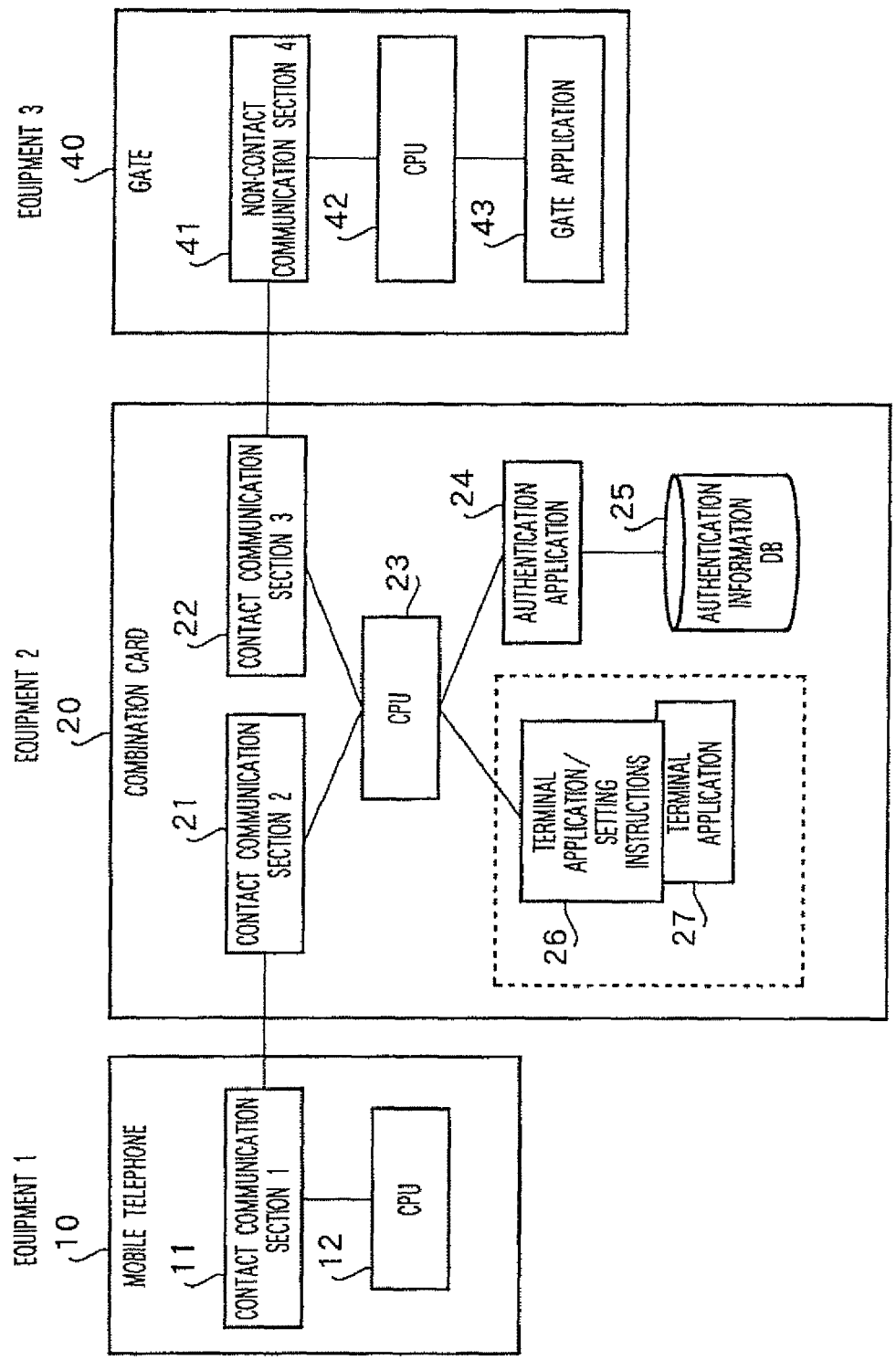
FIG. 1 is a block view showing a configuration for a mobile telephone, combination card and gate of Embodiment 1 of the present invention.

FIG. 1 shows a configuration for a mobile telephone 10, combination card 20 and gate 40 (equipment 3) in the case where a terminal (equipment 1) is a mobile telephone 10, and an IC card (equipment 2) is a chip-shaped combination card 20 installed in mobile telephone 10. Gate 40 is equipped with gate application 43 designating authentication processing and terminal applications for the combination card 20, non-contact communication section (4) 41 performing non-contact communication to combination card 20, and CPU 42 controlling operation of gate 40.

combination card 20 is provided with a non-contact communication section (3) 22 performing non-contact communication with gate 40, contact communication section (2) 21 carrying out contact communication with mobile telephone 10, authentication information database (DB) 25 storing authentication information etc., authentication application 24 performing authentication processing with other equipments 1 and 3, terminal application 27 installed at mobile telephone 10 and respectively installed terminal application/setting instructions 26, and CPU 23 controlling operation of combination card 20.

Further, mobile telephone 10 has contact communication section (1) 11 performing contact communication with combination card 20 and CPU 12 controlling operation of mobile telephone 10.

As shown in FIG. 2, authentication information such as public keys and private keys used in authentication processing and IDs of terminal applications 27 that can be installed to the mobile telephone 10 and IDs for setting instructions designating terminal applications to be set at mobile telephone 10 are stored in authentication information DB 25 of the combination card 20 in a manner correlating with the ID of the gate application 43.

The setting instructions may designate the following, for example, for the mobile telephone 10.

Set a company logo as a background image for a display screen.

Set a company sound as a sound (at the time of a receiving call, or at the time of executing an application).

Add an intranet application for use within a company to the main menu.

Change a default setting to an internal telephone (calls to an outside line changed to 0 calls).

Change the settings (mail server address, user ID, personal information, network settings, etc.) for the mail function.

It is only possible to access a specific mail server at the company.

It is only possible to send mail to specific addresses at the company.

It is only possible to read specific mail at the company.

Accessible application server is limited.

It is only possible to access specific sites at the company.

Further, terminal applications which are possible to install on the mobile telephone 10 are applications necessary to execute setting instructions that are not held at the mobile telephone 10 and are applications such as shown in the following, for example.

Software such as a browser etc. executing displaying based on setting instructions.

For example, in a company, it is possible to switch over to a browser that is only capable of accessing specific sites.

Switching over the mail application. For example, in a company, only specific mail applications where saving of mail is not possible, or specific mail applications where it is only possible to view saved mail inside the company may be provided. For example, saved mail may be saved in a secure memory area of combination card 20 so that access is only possible by a specific mail application.

Figure 3:
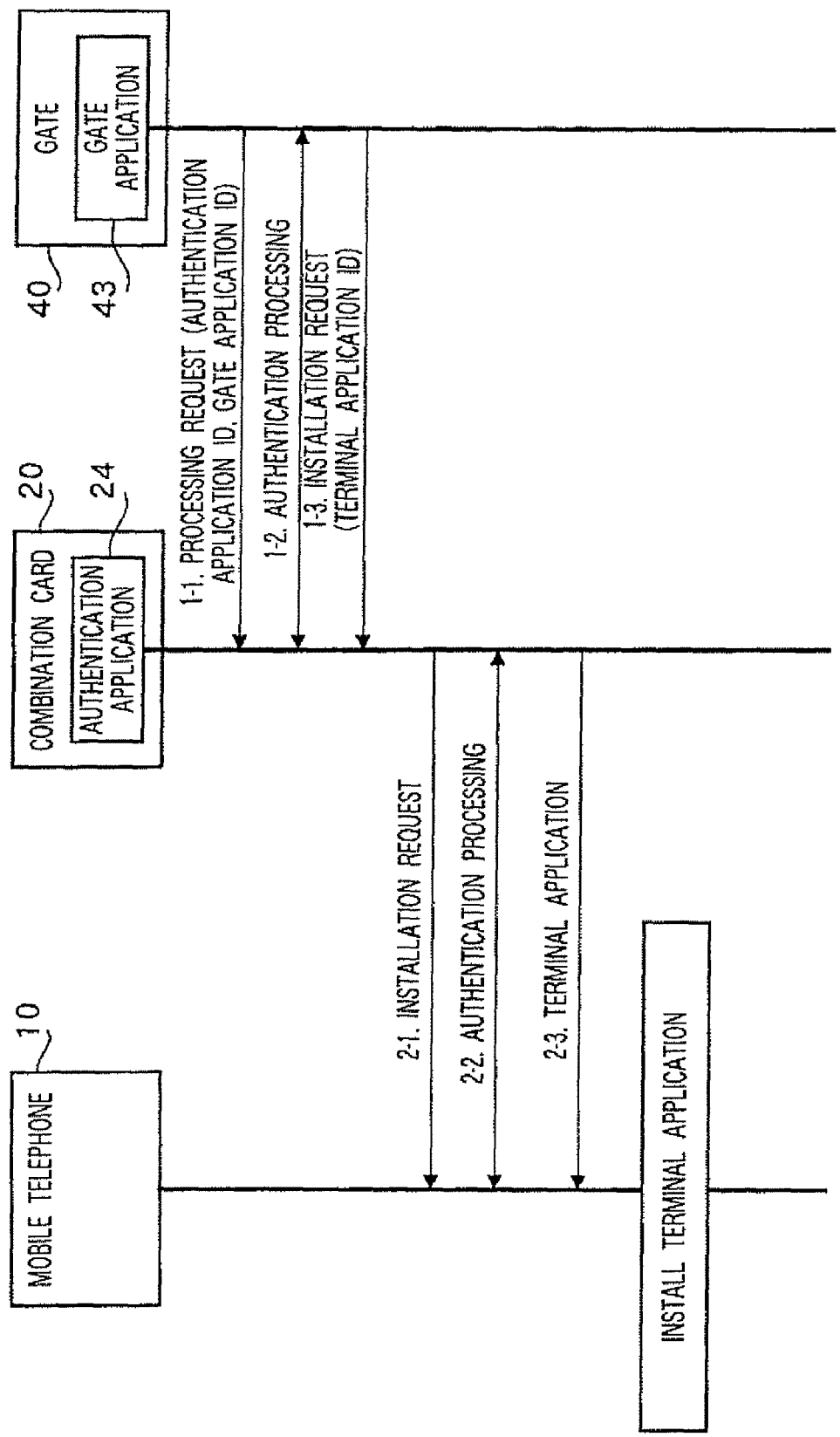
FIG. 3 is a sequence view showing the operation of a mobile telephone, combination card and gate of Embodiment 1 of the present invention.

FIG. 3 shows a sequence for processing carried out as a result of gate 40, combination card 20 and mobile telephone 10 operating in unison.

When a user enters a specific area, the mobile telephone 10 installed with the combination card 20 is held up to the gate 40. When combination card 20 advances to within the range of communication of non-contact communication section 41, CPU 42 of gate 40 designates the authentication application ID and gate application ID at the combination card 20 and requests authentication processing (1-1). CPU 23 of combination card 20 receiving this then starts up authentication application 24, and authentication application 24 executes authentication processing (1-2) using a typical challenge response with gate application 43 using authentication information corresponding to gate application ID of authentication information DB 25. When the authentication processing is successful, gate application 43 designates the terminal application ID and makes a request for installation to the terminal of this terminal application (1-3). More than one terminal application ID may be specified.

The authentication application 24 of combination card 20 receiving this request then confirms (verifies) that this terminal application can be installed from information of authentication information DB 25 and conveys this to CPU 23. CPU 23 then sends an install request indicating the terminal application ID to mobile telephone 10 (2-1), and carries out authentication processing with the mobile telephone 10 at authentication application 24 (2-2). If authentication between both parties is already complete at the time the combination card 20 is installed at the mobile telephone 10, this authentication processing may be omitted. When authentication processing is successful, CPU 23 sends the corresponding terminal applications 26 and 27 to mobile telephone 10 (2-3) and CPU 12 of mobile telephone 10 installs this terminal application.

In this way, installation of a terminal application from combination card 20 to mobile telephone 10 is executed as a result of cooperation of the three parties of the gate 40, combination card 20 and mobile telephone 10, under the condition that authentication of the combination card 20 and the gate 40 is successful. As a result, processing utilizing the operation of the combination card 20 and the terminal application of the mobile telephone 10 is possible only within the area entered into after passing through the gate 40.

In the international standards specification for IC cards (ISO7816 for contact communication, ISO14443 for non-contact communication), exchange of data between the card application of the IC card and the terminal application of the reader/writer side is basically defined as a "command" sent to the card application from the terminal application and a "response" sent from the card application to the terminal application. An IC card satisfying this international standard specification can therefore only operate passively and such a card cannot send installation requests of (2-1) to mobile telephone 10 by itself.

For this reason, in the event that combination card 20 satisfies the international standard specification, mobile telephone 10 continues to send a polling signal to combination card 20 in order to observe the state of the non-contact communication from the time where the user puts the mobile telephone 10 up to the gate 40. When a response for completion of non-contact communication is received from combination card 20, transmission is instructed to combination card 20 if there is a request, and combination card 20 sends an installation request to mobile telephone 10 in response to this (2-1). By adopting this procedure, compatibility with IC cards satisfying international standard specifications is also possible.

Figure 4:
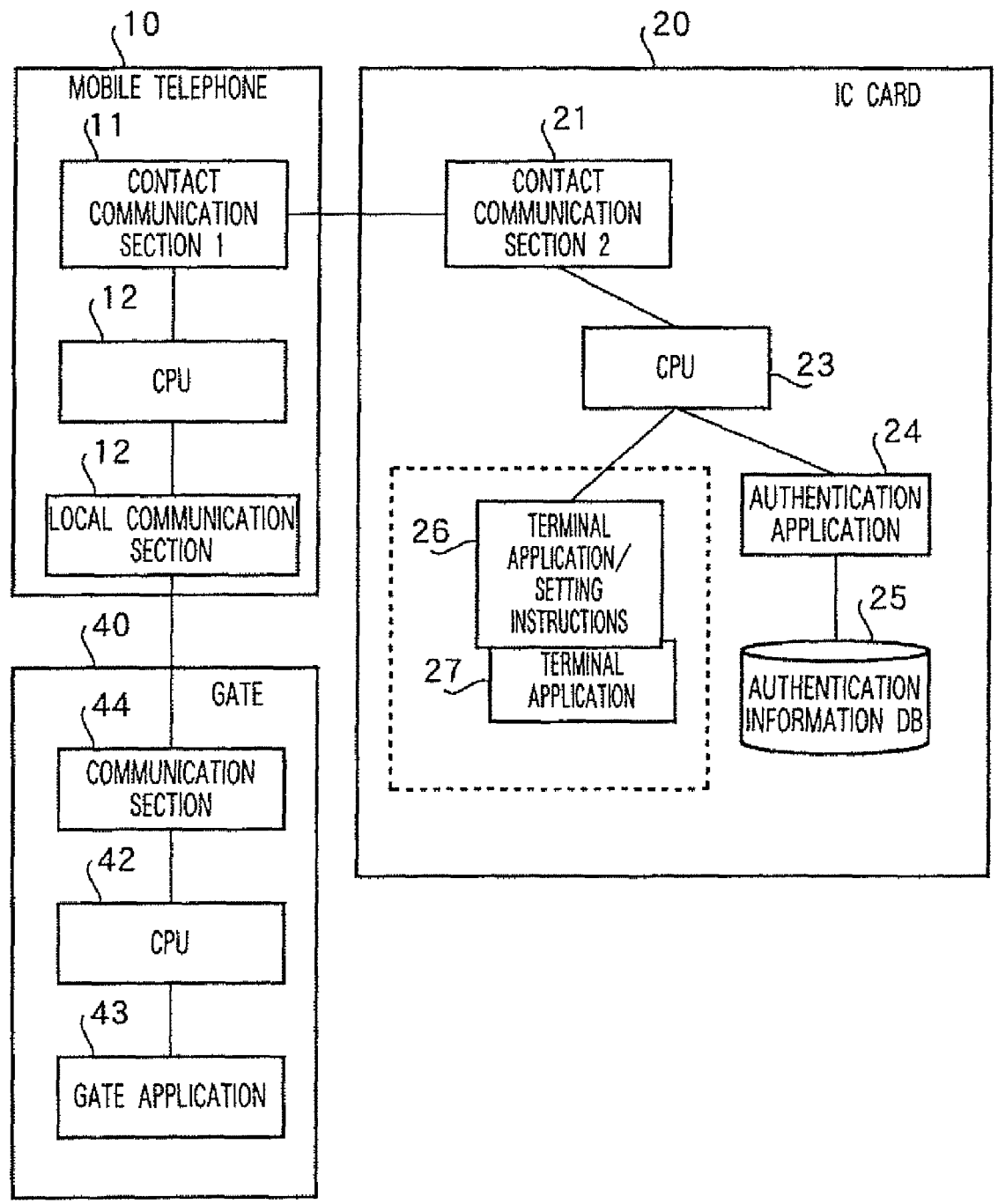
FIG. 4 is a block view showing a configuration for a mobile telephone, IC card and gate of Embodiment 1 of the present invention.

A description is given here of the case where the IC card is a combination card, but as shown in FIG. 4, when the IC card only has a contact communication function, it is possible to carry out communication between the IC card 20 and gate 40 utilizing a local communication section 13 such as infrared of a mobile telephone 10 (Bluetooth or a wireless LAN) etc. In this case, when gate 40 establishes a communication (infrared) connection between communication section 44 and local communication section 13 of mobile telephone 10 and sends an access instruction to IC card 20 at mobile telephone 10, mobile telephone 10 executes a direct communication connection with IC card 20 and communication between gate 40 and IC card 20 is possible. The sequence of data between the three parties of the gate 40, IC card 20 and mobile telephone 10 is the same as for FIG. 3.

Further, when the IC card only has a non-contact communication function, communication is carried out using non-contact communication between mobile telephone 10 and gate 40. Interrogation of non-contact IC card 20 is carried out in order to observe the processing state with the gate 40 from the time where the user holds the mobile telephone 10 up to the gate 40. When processing with the gate 40 is complete, non-contact IC card 20 returns a notification of completion to mobile telephone 10. As a result, mobile telephone 10 instructs transmission to the non-contact IC card 20 if there is a request and an install request is sent to mobile telephone 10 in response to this (2-1). Further, when processing with gate 40 is complete, non-contact IC card 20 notifies mobile telephone 10 of completion and sends an installation request to mobile telephone 10 (2-1).

Embodiment 2

In a second embodiment of the present invention, a description is given of the case of permitting utilization of a card application stored in an IC card at a terminal under the condition of successful authentication of the IC card and gate. When authentication of the IC card is successful, the gate conveys an ID of a gate application allowed to be utilized at the terminal and gate PIN information specifying the gate to the IC card, and pair information for this card application ID and gate PIN is stored in the IC card. The IC card then designates the card application from the terminal, refers to this pair information when this utilization is requested, and decides whether or not to permit utilization of this card application.

Figure 5:
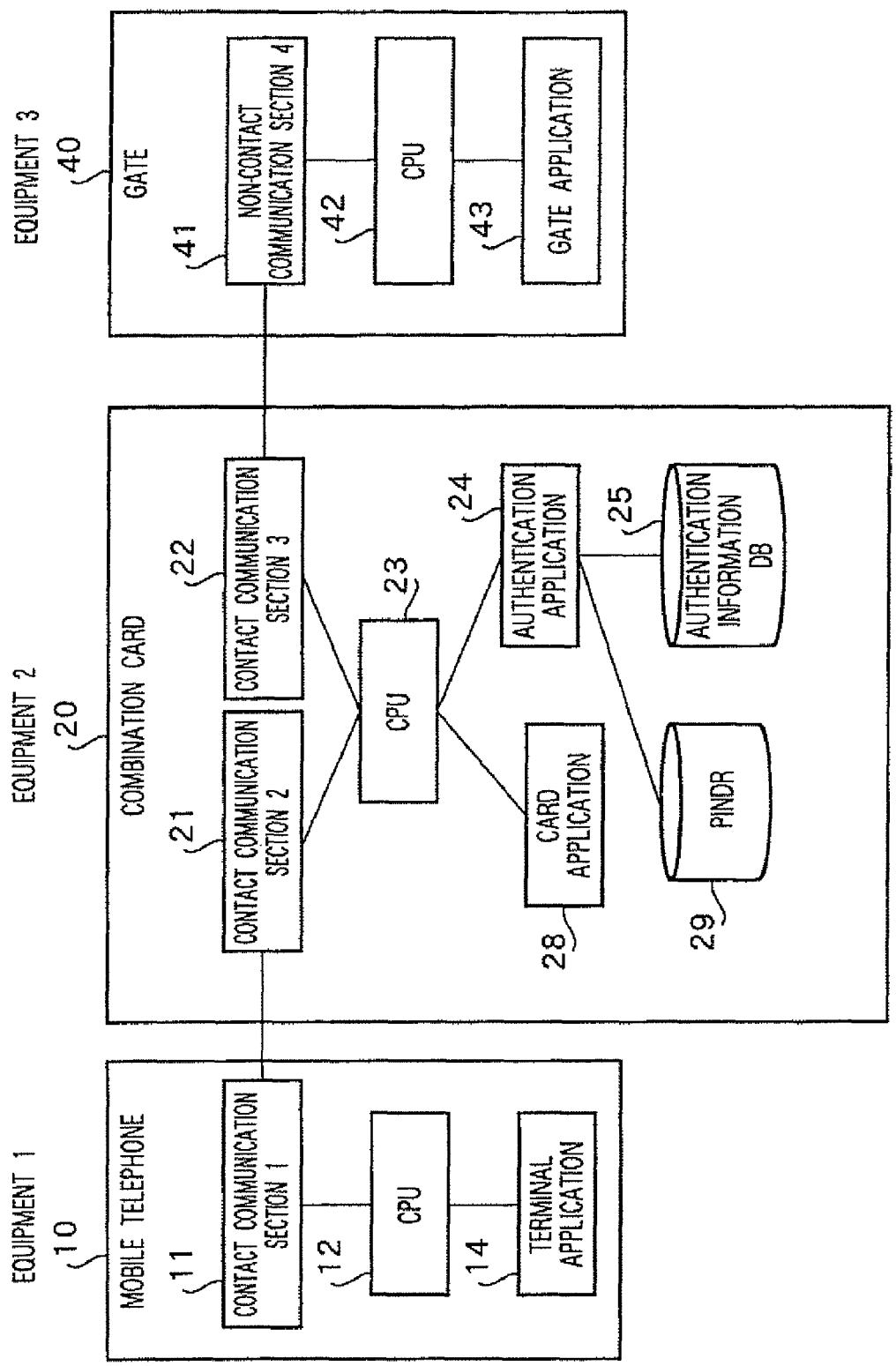
FIG. 5 is a block view showing a configuration for a mobile telephone, combination card and gate of Embodiment 2 of the present invention.

FIG. 5 shows a configuration for mobile telephone 10, combination card 20 and gate 40 acting in unison to perform this processing. As in Embodiment 1 (FIG. 1), the combination card 20 is provided with non-contact communication section (3) 22, contact communication section (2) 21, authentication information DB 25, authentication application 24 and CPU 23, and is further provided with card application 28 effective in the event that authentication with gate 40 is successful, and PINDB 29 storing pair information for the card application ID and gate PIN. Further, in addition to contact communication section (1) 11 and CPU 12, mobile telephone 10 is provided with terminal application 14 utilizing card application 28. The configuration of gate 40 has not changed from Embodiment 1 (FIG. 1).

As shown in FIG. 6, authentication information used in authentication processing, a card area ID capable of gate PIN setting (i.e. enabling utilization in an area entered into from gate 40), and an ID for a card application terminating the PIN setting (i.e. so that utilization is no longer possible in this area) are stored at authentication information DB 25 of combination card 20 so as to correlate with the ID of the gate application 43.

Gate application 28 capable of being utilized in the area entered to from gate 40 is, for example, an in-office extension number telephone book application capable of accessing an internal line book stored in combination card 20 from terminal application 14 executing a telephone book function of mobile telephone 10 when authentication of combination card 20 and gate 40 is successful.

Figure 7:
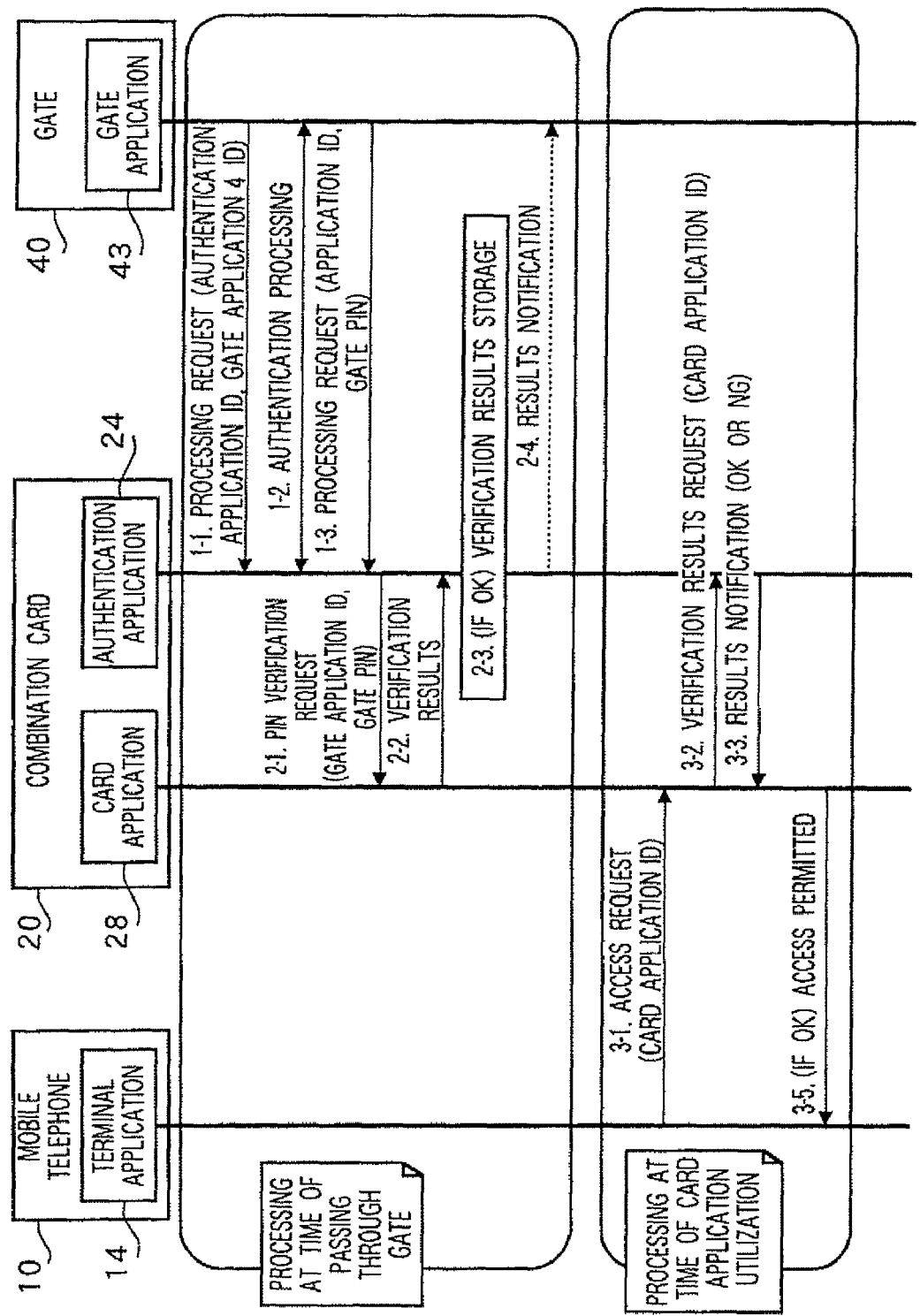
FIG. 7 is a sequence view showing the operation of a mobile telephone, combination card and gate of Embodiment 2 of the present invention.

FIG. 7 shows a sequence for processing carried out as a result of gate 40, combination card 20 and mobile telephone 10 operating in unison.

When the user holds mobile telephone 10 installed with computer card 20 up to the gate 40, the gate 40 indicates the authentication application ID and the gate application ID at the combination card 20 and requests authentication processing between both parties (1-1). Authentication application 24 of combination card 20 receiving this then executes authentication processing for the gate application 43 using authentication information corresponding to the gate application ID of the authentication information DB 25 (1-2). Gate application 43 for which authentication processing is successful then designates the ID of the card application it is wished to set (or delete) the gate PIN for and requests registration (or deletion) of pair information for the card application ID and gate PIN (1-3). The number of card application IDs indicated by gate application 43 at this time may be more than one.

The authentication application 24 of the combination card 20 then sends information for the gate application ID and gate PIN to the gate application 28 corresponding to this card application ID and requests confirmation (verification) (2-1). The card application 28 then refers to the authentication information DB 25, verifies whether or not a correspondence relationship with the gate application exists (whether or not setting of the gate PIN is possible), and returns the verification results to the authentication application 24 (2-2). In the event that the authentication results are "OK", authentication application 24 stores pair information for the verified card application ID and gate PIN (2-3), and notifies the gate application 43 of the verification results (2-4). The above is processing at the time of passing through a gate.

On the other hand, the following processing is carried out in the case where the terminal application 14 of the mobile telephone 10 utilizes the card application 24.

Terminal application 14 of mobile telephone 10 designates the card application ID and requests an access to card application 28 of combination card 20 (3-1). Card application 28 indicates the card application ID to authentication application 24 and requests verification results (3-2). Authentication application 24 refers to PINDB 29, responds with OK when pair information for the card application ID and gate PIN is registered, and responds with NG when not registered (3-3). Card application 28 permits access to terminal application 14 in the event that the response from authentication application 24 is OK (3-5).

As a result of this processing, it is possible to utilize the card application 28 only in the event that a user enters the correct gate 40 so that, for example, when a user holds mobile telephone 10 fitted with an IC card such as combination card 20 etc. up to a legitimate gate 40 so as to enter an office, an extension number telephone book application for office use stored in the IC card automatically becomes effective.

In the event that the card application ID designated by gate application 43 is recorded in the authentication information DB 25 as a card application ID canceling the PIN setting, the authentication application 24 refers to PINDB 29, and deletes pair information for the card application ID and gate PIN recorded at this location.

By doing this in conjunction with deletion processing of PINDB 29, for example, after a user carries out entrance processing and enters a certain office, in the event that entrance processing is performed and another office is entered, the extension number telephone book application for use within the previous office is invalidated, and only the extension number telephone book application for use within the office entered afterwards is made valid.

It is also possible to encrypt messages and data for each process for transmission in order to prevent eavesdropping by a third party.

Further, in FIG. 7, storage of the verification results of (2-3) may also be just storage of information indicating that the verification results for the card application ID are "OK" in PINDB 29.

Further, IC cards such as combination card 20 etc. may also have only contact communication functions. In this case, as described in Embodiment 1 (FIG. 4), communication is carried out between the IC card and the gate utilizing a local communication section of mobile telephone 10. Moreover, the IC card may also have just a non-contact communication function.

At authentication information DB 25 shown in FIG. 6, in the event that a plurality of card application IDs are set for one gate application ID, it is possible to set priority for a card application permitting access of the terminal application 14. In this case, as shown in FIG. 8, a priority setting DB setting priority of a card application ID capable of priority setting and a card application ID capable of terminating the priority setting is held in a manner corresponding to the gate application ID. Alternatively, as shown in FIG. 9A, priority of each card application ID is defined by a priority template, and a priority setting DB set with a priority template corresponding to the gate application ID as shown in FIG. 9B is held.

In the event that card application 28 corresponding to the gate application ID is selected from authentication information DB 25, the priority setting DB is referred to, and a card application 28 selected based upon priority is decided upon.

Embodiment 3

In Embodiment 3 of the present invention, a description is given for utilization of a card application stored in an IC card under the condition of successful authentication of the IC card and gate for the case where processing between the three parties of the CI card, gate and terminal in the configuration of Embodiment 2 providing permission to the terminal is carried out using a difference procedure to that of Embodiment 2.

Figure 10:
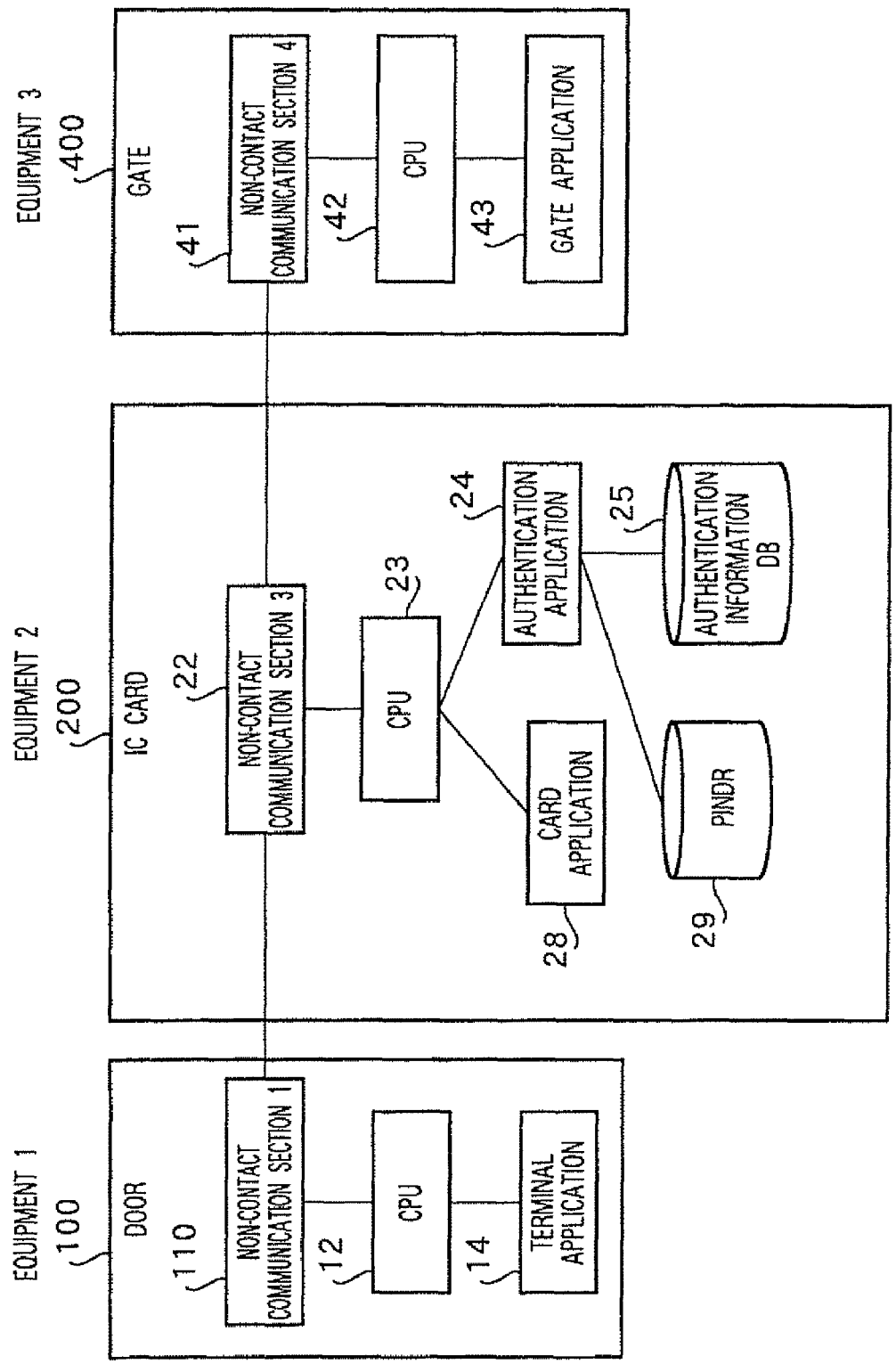
FIG. 10 is a block view showing a configuration for a door, IC card and gate of Embodiment 3 of the present invention.

Here, as shown in FIG. 10, a description is given where equipment a is a door 100 having a non-contact communication section (1) and equipment 2 is an IC card 200 having only a non-contact communication section 22. Other configurations for the equipment 1, equipment 2, and equipment 3 have not changed from that of Embodiment 2 (FIG. 5). Here, only a non-contact communication section 22 is included, but it is also possible for only a contact communication section to be included.

Figure 11:
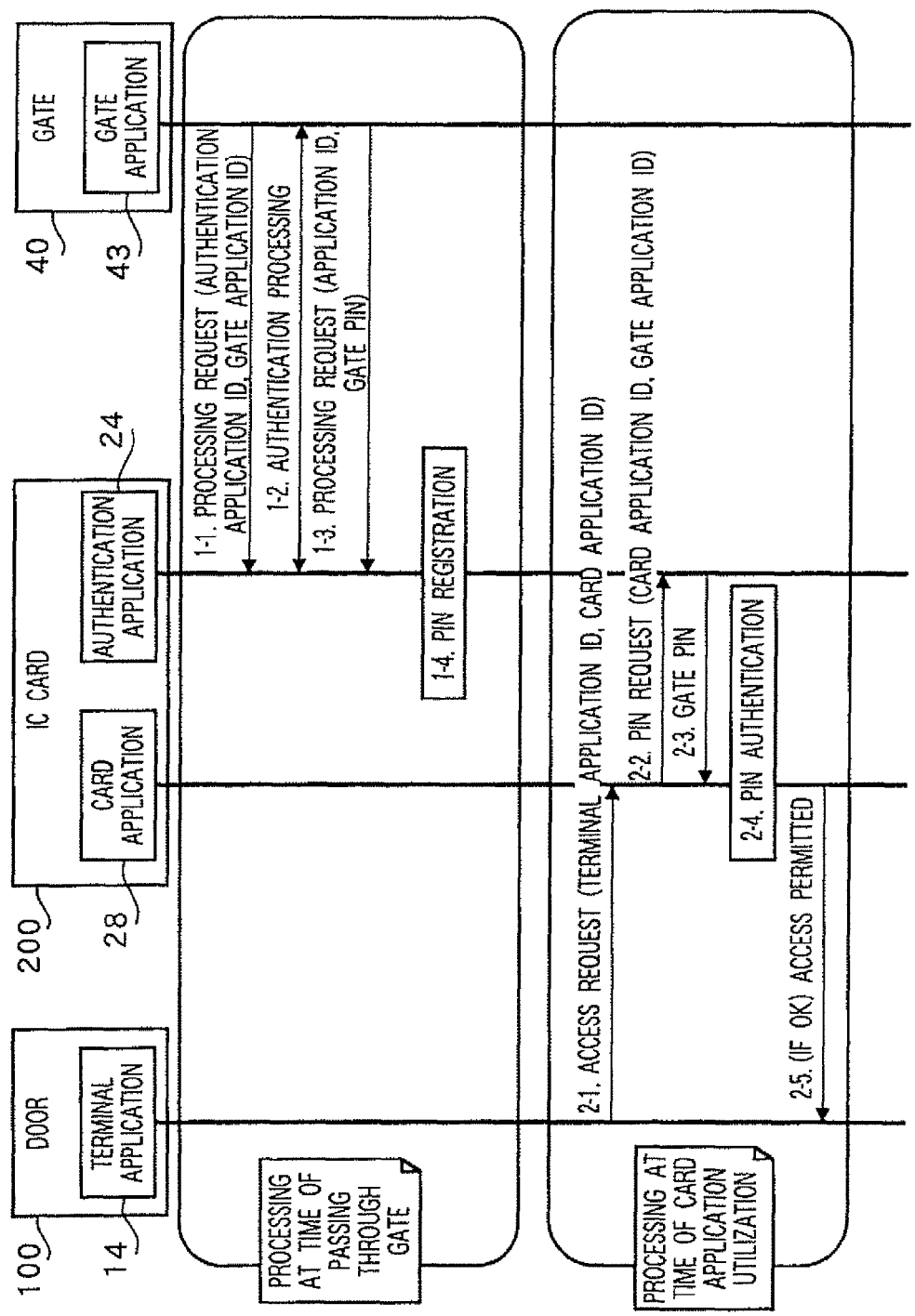
FIG. 11 is a sequence view showing the operation of a door, IC card and gate of Embodiment 3 of the present invention.

FIG. 11 shows a sequence for processing carried out as a result of cooperation of the gate 40, IC card 200 and door 100.

When the user holds IC card 200 up to the gate 40, gate 40 indicates the authentication application ID and the gate application ID at the IC card 200 and requests mutual authentication processing (1-1). Authentication application 24 of IC card 200 receiving this then executes authentication processing for the gate application 43 using authentication information corresponding to the gate application ID of the authentication information DB 25 (1-2). The gate application 43 for which authentication processing is successful then designates an ID of a gate application setting the gate PIN, requests registration of pair information for the card application and gate PIN to the authentication application 24 (1-3), and authentication application 24 of the IC card 200 registers pair information for the card application ID and gate PIN in PINDB 29 in accordance with the request (1-4). In this registration stage, verification with the authentication information DB 25 is not complete. The above is processing at the time of passing through a gate.

On the other hand, when the user holds the IC card 200 up to the door 100, the following processing is carried out.

Terminal application 14 of the door 100 indicates the terminal application ID and card application ID and requests access to card application 28 of IC card 200 (2-1). The card application 28 requests registration information for PINDB 29 indicating the card application ID and gate application ID (2-2) to authentication application 24, and authentication application 24 acquires the pair information for the corresponding card application ID and gate PIN from the PINDB 29 for indication at the card application 28 (2-3). The card application 28 then refers to the authentication information DE 25, verifies whether there is a correspondence relationship with the gate application (whether or not setting of the gate PIN is possible) (2-4), and in the event that the verification results are OK, permits access to the terminal application 14 (2-5).

Terminal application 14 of the door 100 accessing the card application 28, for example, acquires key information from the card application 28 so that it is possible for the user to pass through the door 100.

In this way, it is possible to ensure that a door will not open if entrance does not take place from the correct entrance (gate) by ensuring that the gate 40, IC card 200 and door 100 operate in unison.

In this PIN verification (2-4), it is also possible for the card application 28 to verify the pair of the terminal application 14 and gate PIN. In this event, it is possible to perform control in such a manner that access is not permitted (i.e. a certain door will not open unless entering takes place from a specific entrance) if there is not correspondence with a specific gate PIN at a certain terminal application 14.

Figure 12:
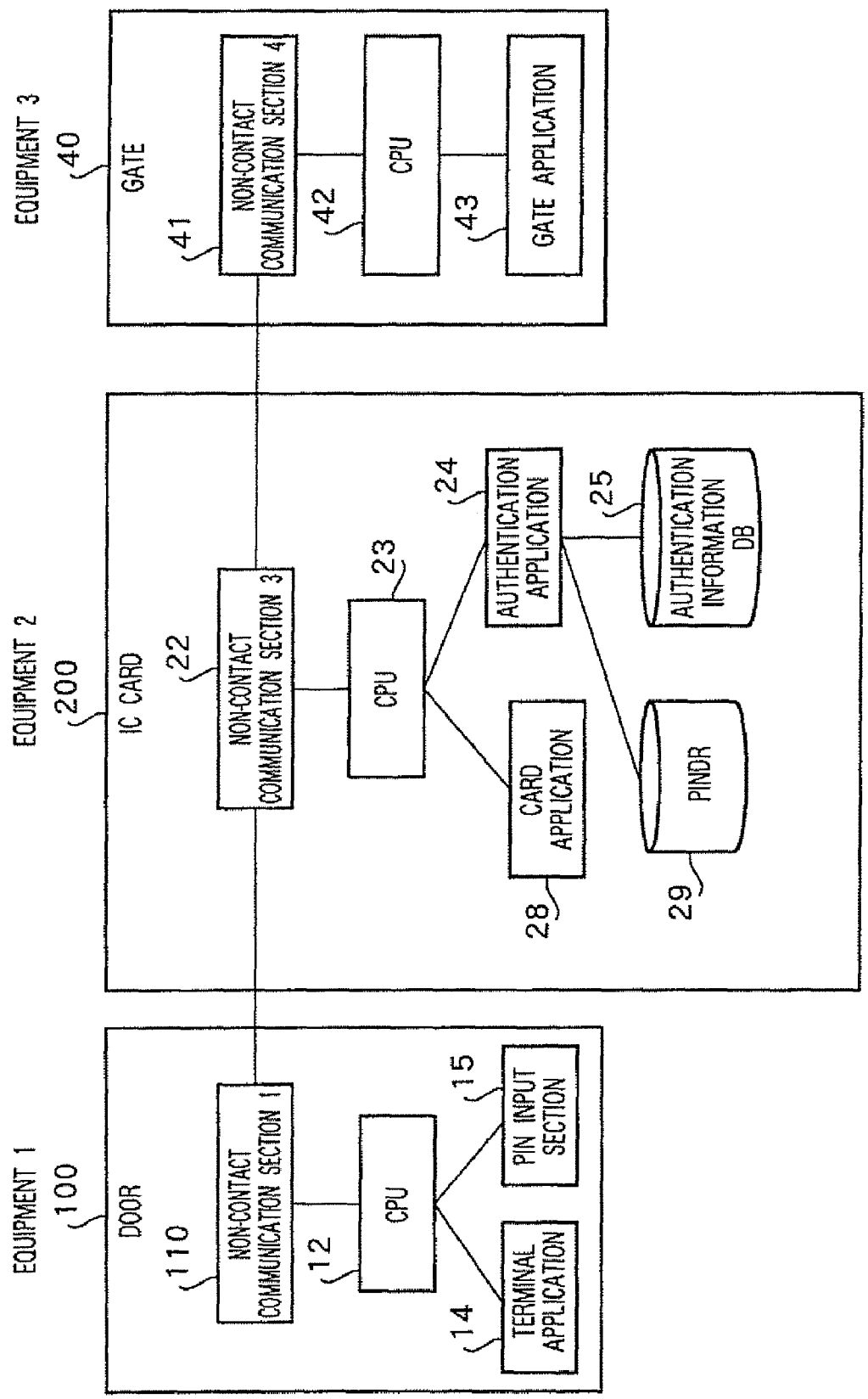
FIG. 12 is a block view showing a configuration for a door having a pin input section, IC card and gate of Embodiment 3 of the present invention.

Further, as shown in FIG. 12, it is also possible to perform control in such a manner that a PIN input section 15 is provided at the door 100 so that the user PIN input by the user from the PIN input section 14 is further verified and the door 100 is opened.

Figure 13:
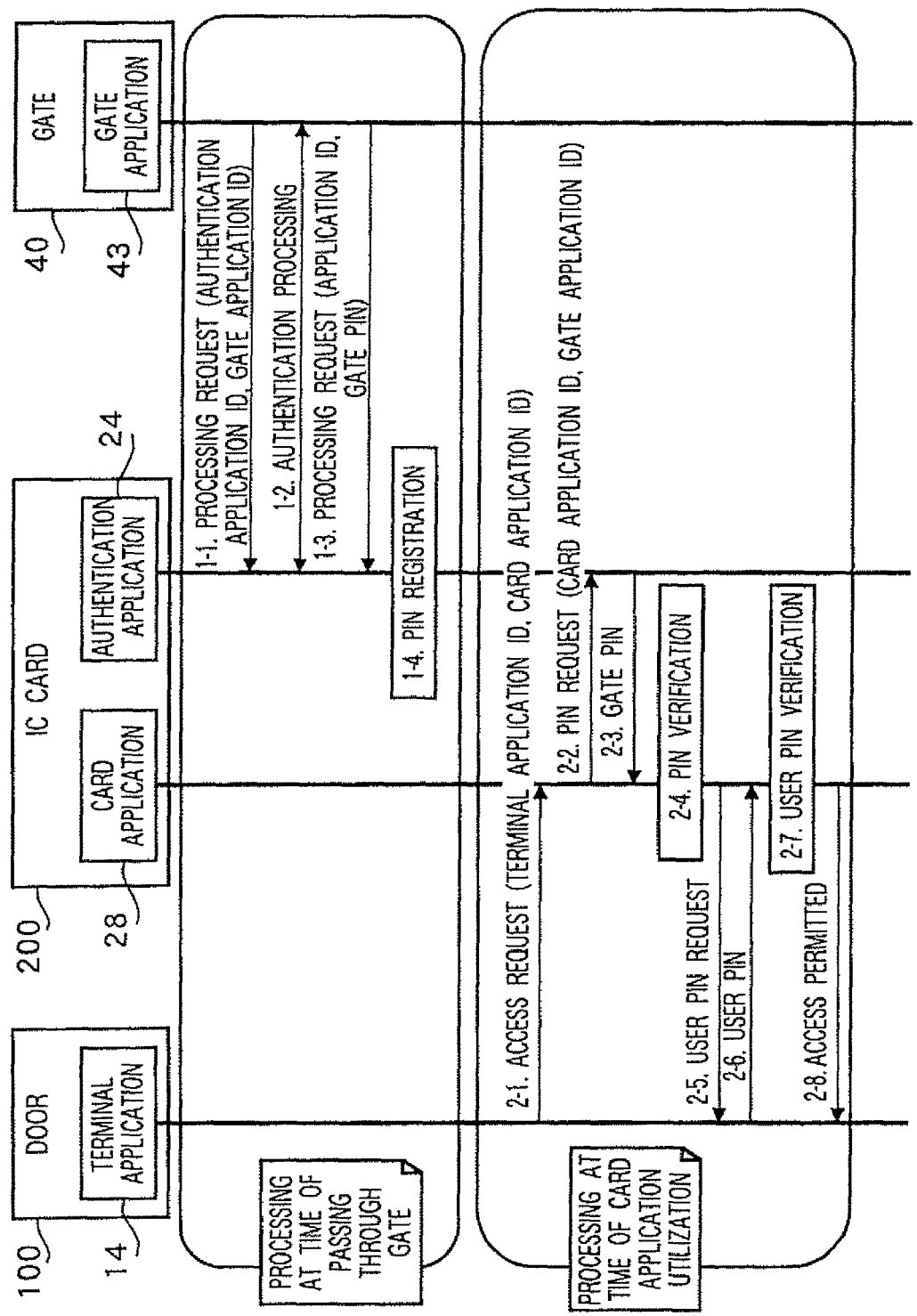
FIG. 13 is a sequence view showing the operation of a door having a PIN input section, IC card and gate of Embodiment 3 of the present invention.

FIG. 13 shows a sequence for this case. Processing up until the gate PIN is verified (2-4) is the same as for the case in FIG. 11. In the event that the verification results for the gate PIN are OK, gate application 28 makes a request to door 100 for the user PIN (2-5), and when the user inputs the user PIN from the PIN input section 15 (2-6), the card application 28 collates this with the user PIN held in the PINDB 29 of the IC card 200 and this is verified (2-7). In the event that the verification results match, access to the terminal application 14 is permitted (2-8).

Embodiment 4

In Embodiment 4 of the present invention, a description is given of the case where processing of equipment is possible under the condition that authentication processing for the IC card and the gate is successful.

When authentication processing with the gate is successful, the IC card acquires the gate PIN from the gate and sends this gate PIN to the equipment. The equipment then starts processing after completion of verification of the gate PIN.

Figure 14:
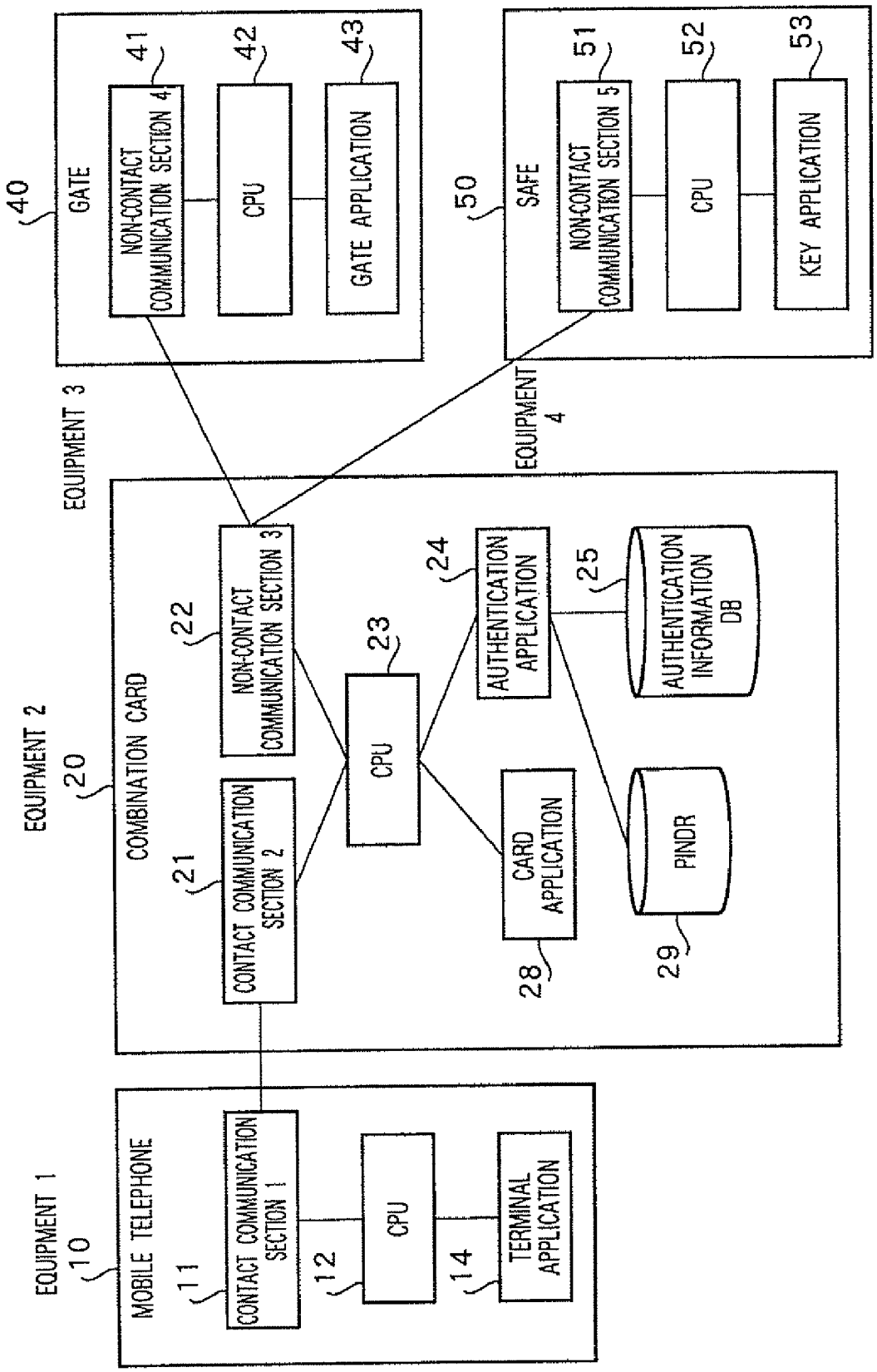
FIG. 14 is a block view showing a configuration for a mobile telephone, combination card, gate and safe of Embodiment 4 of the present invention.

FIG. 14 shows the configuration of the gate 40, combination card 20 and mobile telephone 10, and the configuration for the case where the equipment (equipment 4) is a safe 50. The mobile telephone 10 installed with this combination card 20 is held up to the gate 40, and authentication processing between the combination card 20 and the gate 40 is carried out. In the event that the authentication is successful, this mobile telephone 10 is held up to the safe 50 and it is possible to unlock the safe 50 as a result of inputting the user PIN from the mobile telephone 10.

The safe 50 is provided with a non-contact communication section (5) 51 carrying out non-contact communication with the combination card 20, a key application 53 controlling opening and closing of the key of the safe 50, and a CPU 52 controlling operation of the safe 50. The configuration of the gate 40' combination card 20 and mobile telephone 10 has not changed from that of Embodiment 2 (FIG. 10).

When the mobile telephone 10 with combination card 20 installed is held up to the gate 40, the processing from (1-1) to (1-4) of FIG. 13 is carried out between the gate 40 and the combination card 20.

Figure 15:
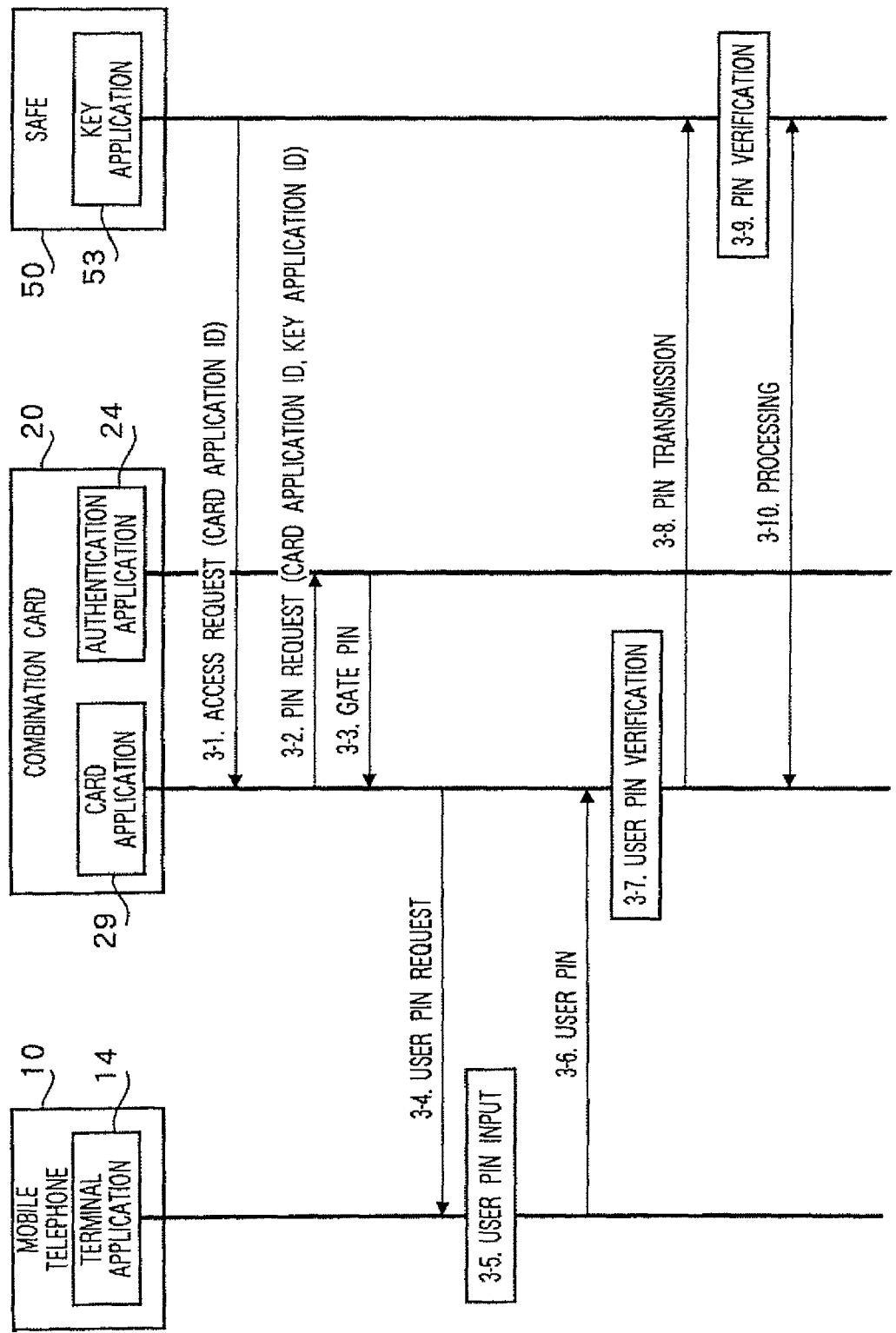
FIG. 15 is a sequence view showing the operation of a mobile telephone, combination card, gate and safe of Embodiment 4 of the present invention.

FIG. 15 then shows a processing sequence for when the user holds the mobile telephone 10 with a combination card 20 installed up to the safe 50.

Key application 53 of safe 50 then indicates the card application ID and requests access to the card application 29 to the combination card 20 (3-1). Card application 29 then indicates the card application ID and key application ID, and requests a gate PIN to the authentication application 24 (3-2). Authentication application 24 then refers to PINDB 29, acquires gate PIN information corresponding to the card application ID, and returns this to the card application 29 (3-3).

Next, card application 29 makes a request to the terminal application 14 of mobile telephone 10 for a user PIN (3-4). The terminal application 14 displays a PIN input screen, and when the user inputs a PIN (3-5), this user PIN is sent to the card application 29 (3-6). The card application 29 then collates this with the user PIN information held in the PINDB 29 of the combination card 20 and verifies this (3-7). In the event that the verification results for the user PIN match, the gate PIN is sent to key application 53 of the safe (3-8). The key application 53 collates and verifies gate PIN information held in advance and a gate PIN sent from card application 29 (3-9), and in the event that the verification results match, key processing is executed (3-10).

In this way, for example, in the event that gate 40 is located at an entrance, the key for the safe 50 can only be used when entering processing at the entrance is carried out correctly.

Various changes are possible regarding the period of carrying out verification of the user PIN and gate PIN or the main body carrying out verification etc. For example, rather than the key application 53 carrying out verification of the gate PIN (3-9), it is also possible for the card application 29 to carry out verification of the gate PIN together with the user PIN verification (3-8) and convey the verification results to the key application 53.

Further, the input user pin may be sent to the key application 53 in place of the card application 29 carrying out PIN verification (3-8), with the key application 53 then performing collation with the user PIN registered in the safe 50 and carrying out user PIN verification.

Figure 16:
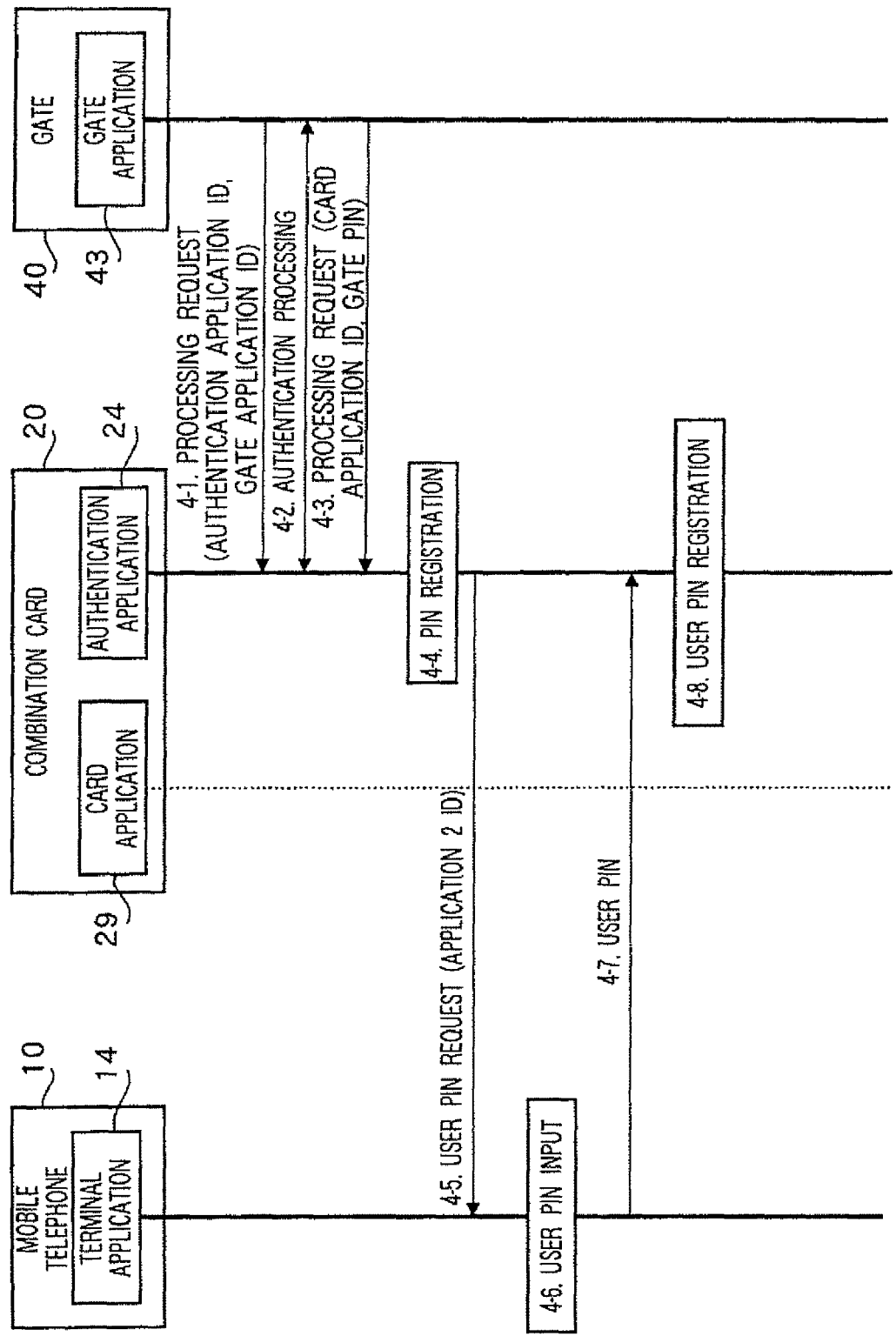
FIG. 16 is a sequence view showing the operation of a mobile telephone, combination card and gate of Embodiment 4 of the present invention.
Figure 17:
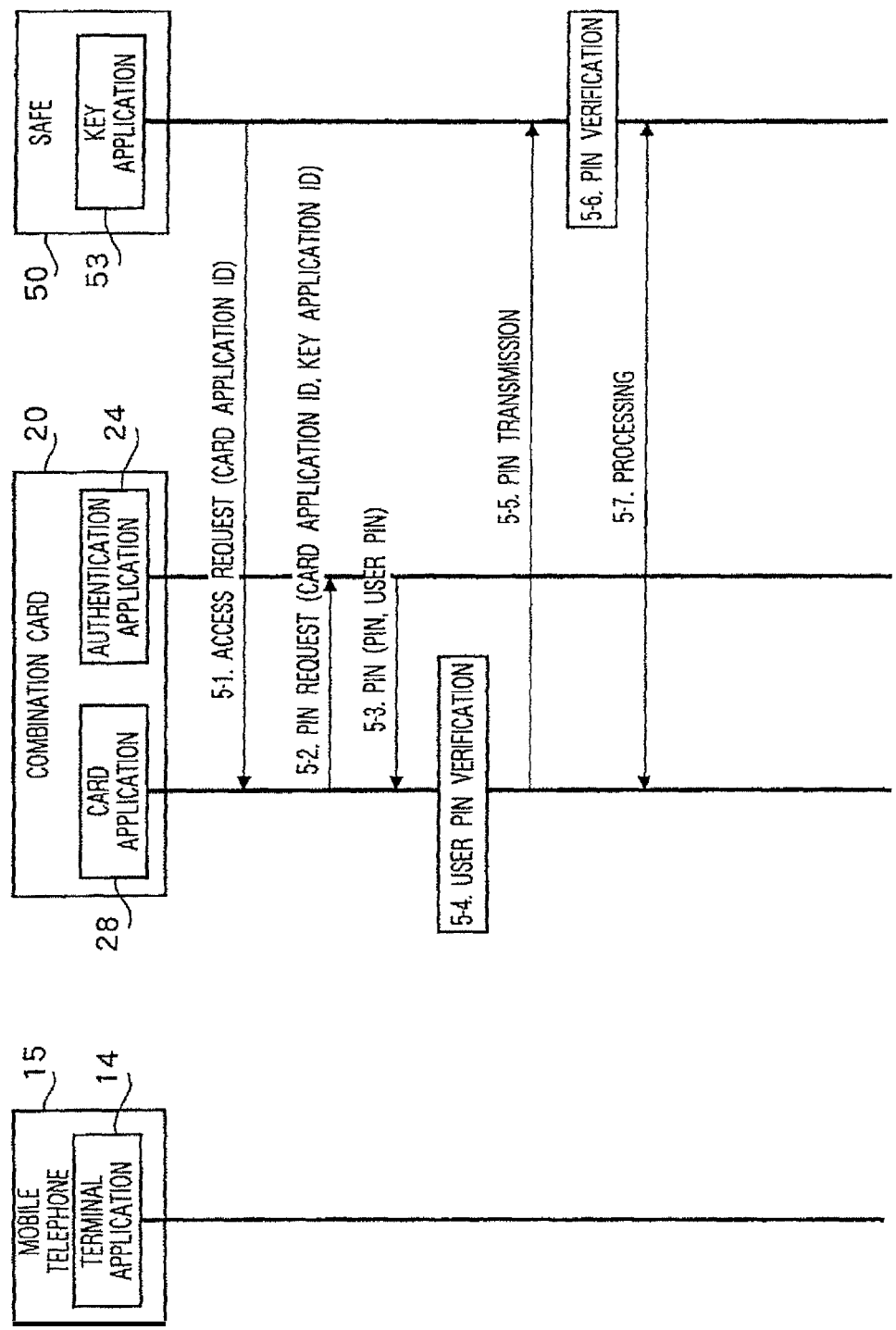
FIG. 17 is a sequence view showing the operation of a mobile telephone, combination card, gate and safe of Embodiment 4 of the present invention (continued from FIG. 16)

Moreover, as shown in FIG. 16, the authentication application 24 for which PIN registration (4-4) is complete then makes a request for a user PIN to terminal application 14 (4-5), and the input user PIN may then be registered as is in PINDB 29 (4-8). In this case, as shown in FIG. 17, at the stage where the mobile telephone 10 is held up to the safe 50, the card application 29 acquires the gate PIN and user PIN from PINDB 29 (5-3), the user PIN is verified (5-4), and the gate PIN is sent to the key application 53 of the safe 50 (5-5). In this scheme, as user PIN input is completed in advance, it is not necessary for the user to perform an input operation in front of the safe 50.

Figure 18:
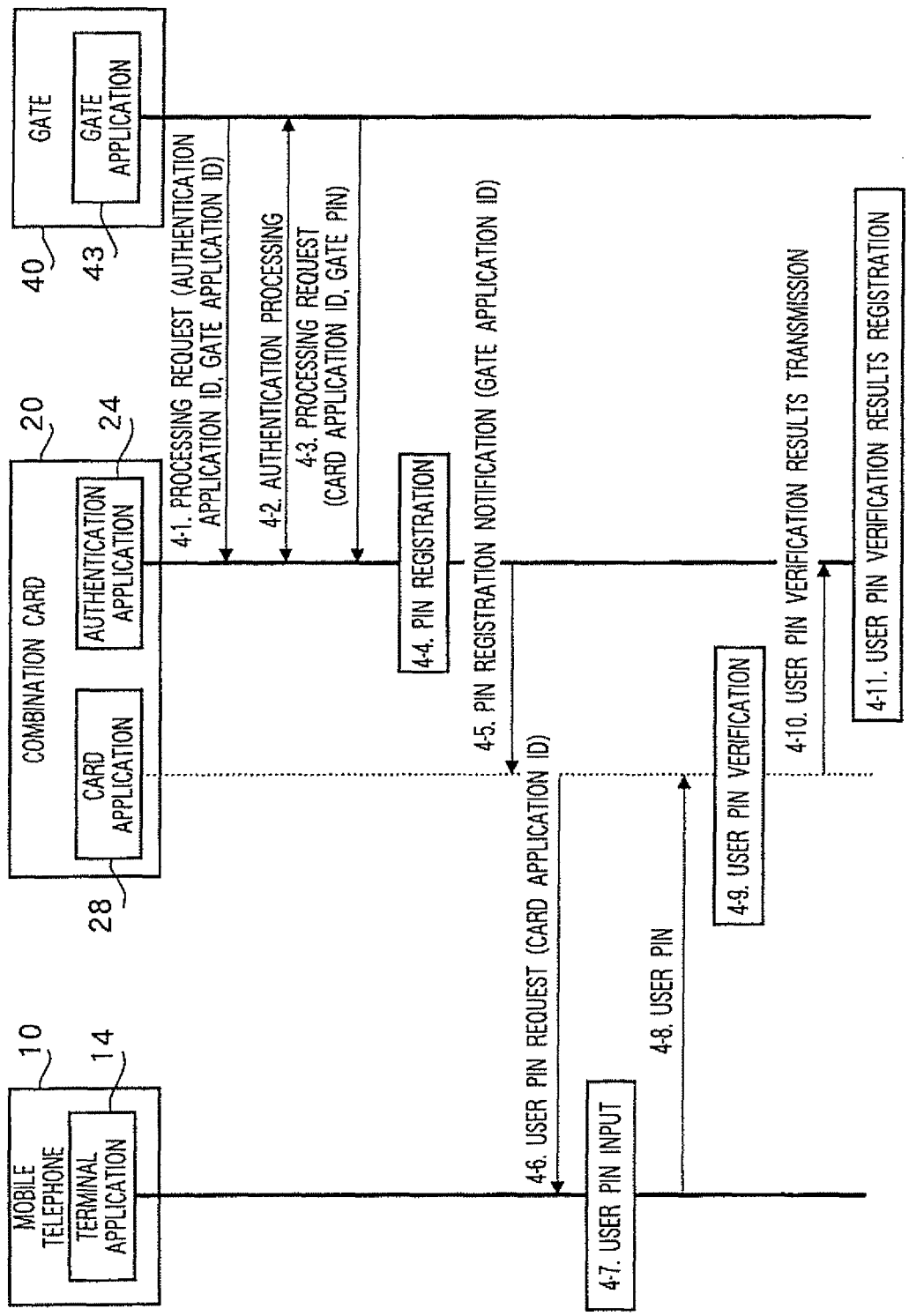
FIG. 18 is a sequence view showing the operation of a mobile telephone, combination card and gate of Embodiment 4 of the present invention.
Figure 19:
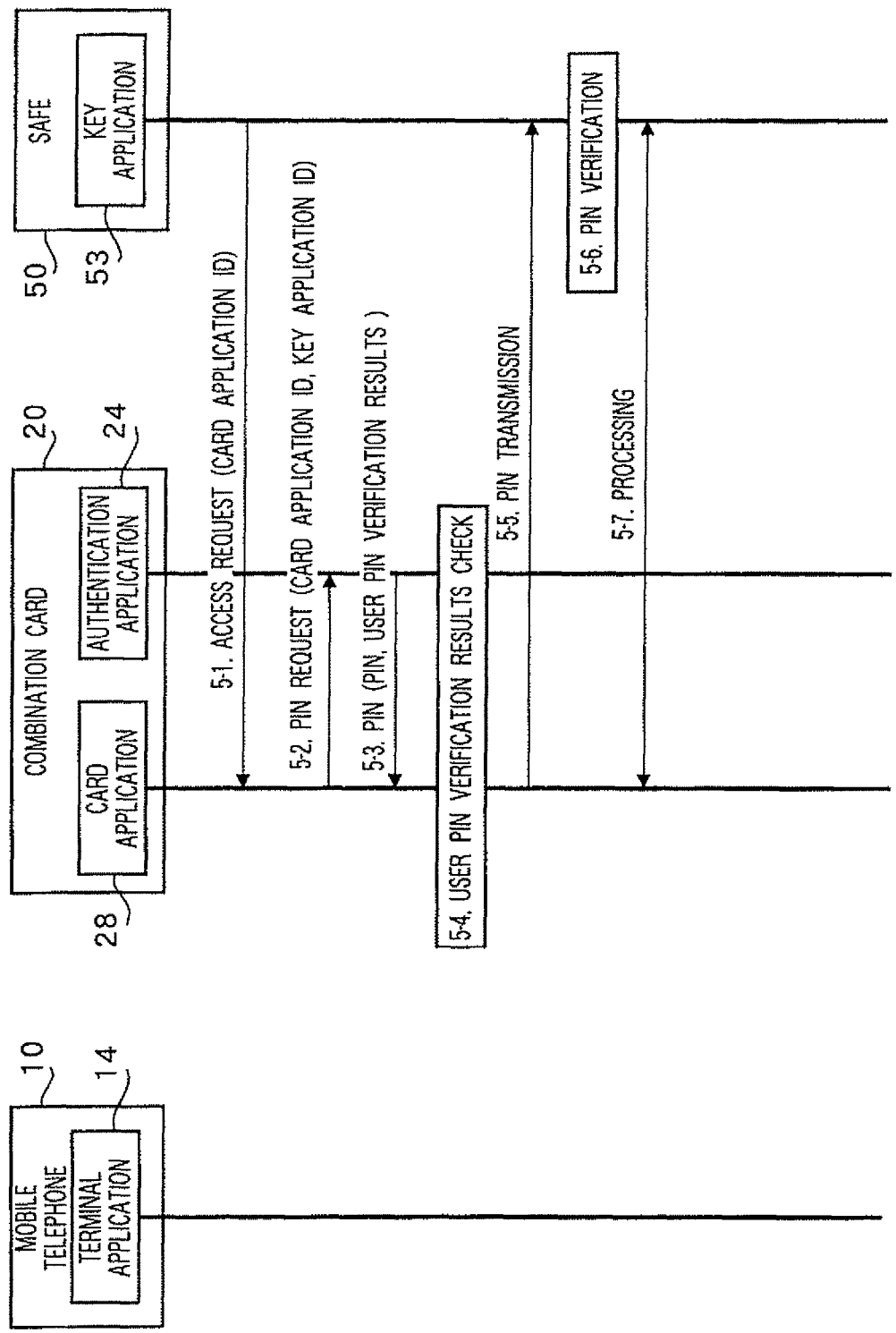
FIG. 19 is a sequence view showing the operation of a mobile telephone, combination card, gate and safe of Embodiment 4 of the present invention (continued from FIG. 18)

Further, as shown in FIG. 18, at the time where PIN registration (4-4) is complete, the authentication application 24 carries out PIN registration notification (gate application ID) on the card application 29 (4-5), and the card application 28 receiving this notification requests a user PIN while passing over the card application ID to the mobile telephone 10 (4-6). Terminal application 14 of the mobile telephone 10 inputs the user PIN (4-7), and sends the user PIN to the card application 28 of the combination card 20. At the combination card 20, the user PIN input by the card application 28 is verified (4-9), and the user PIN authentication results are sent to the authentication application 24. At authentication application 24, the verification results for the user PIN from the card application 28 may be registered (4-11). In this event, as shown in FIG. 19, it is sufficient just to check the verification results for the user (5-4) at the stage where the mobile telephone 10 is held up to the safe 50. In this scheme, user PIN verification is carried out at an early stage, and revision can therefore take place at an early stage in the event that a user makes an error regarding a PIN input.

Figure 20:
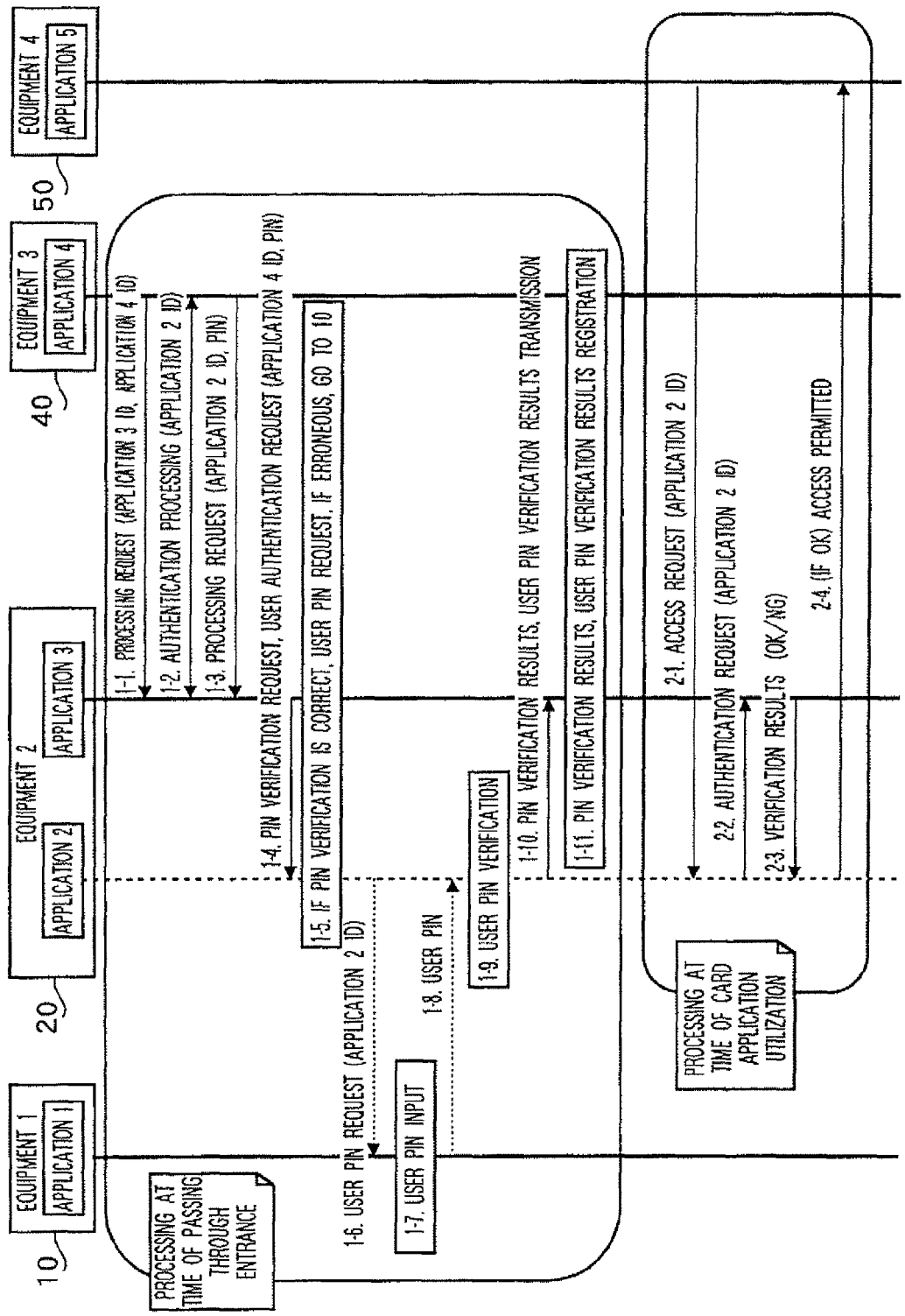
FIG. 20 is a sequence view showing the operation of a mobile telephone, combination card, gate and safe of Embodiment 4 of the present invention.

Further, FIG. 20 shows a sequence for the case where gate application (application 2) of the combination card (equipment 2) carries out a user PIN request, gate PIN verification, and user PIN verification.

Figure 21:
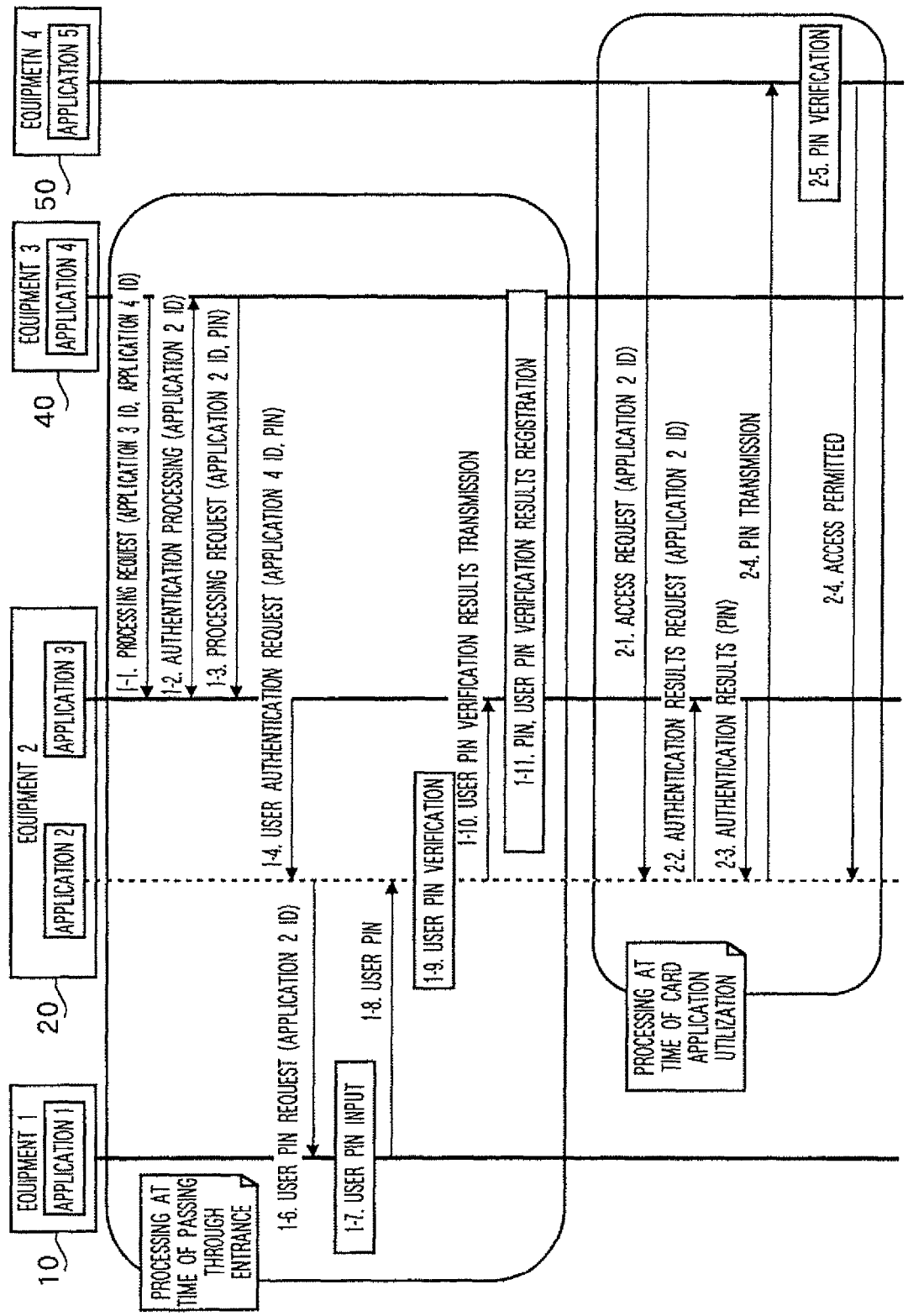
FIG. 21 is a sequence view showing the operation of a mobile telephone, combination card, gate and safe of Embodiment 4 of the present invention.

Moreover, FIG. 21 shows a sequence for the case where a card application (application 2) of the combination card (equipment 2) carries out a user PIN request and user PIN verification, and key application (application 5) of the safe (equipment 4) carries out gate PIN verification.

Figure 22:
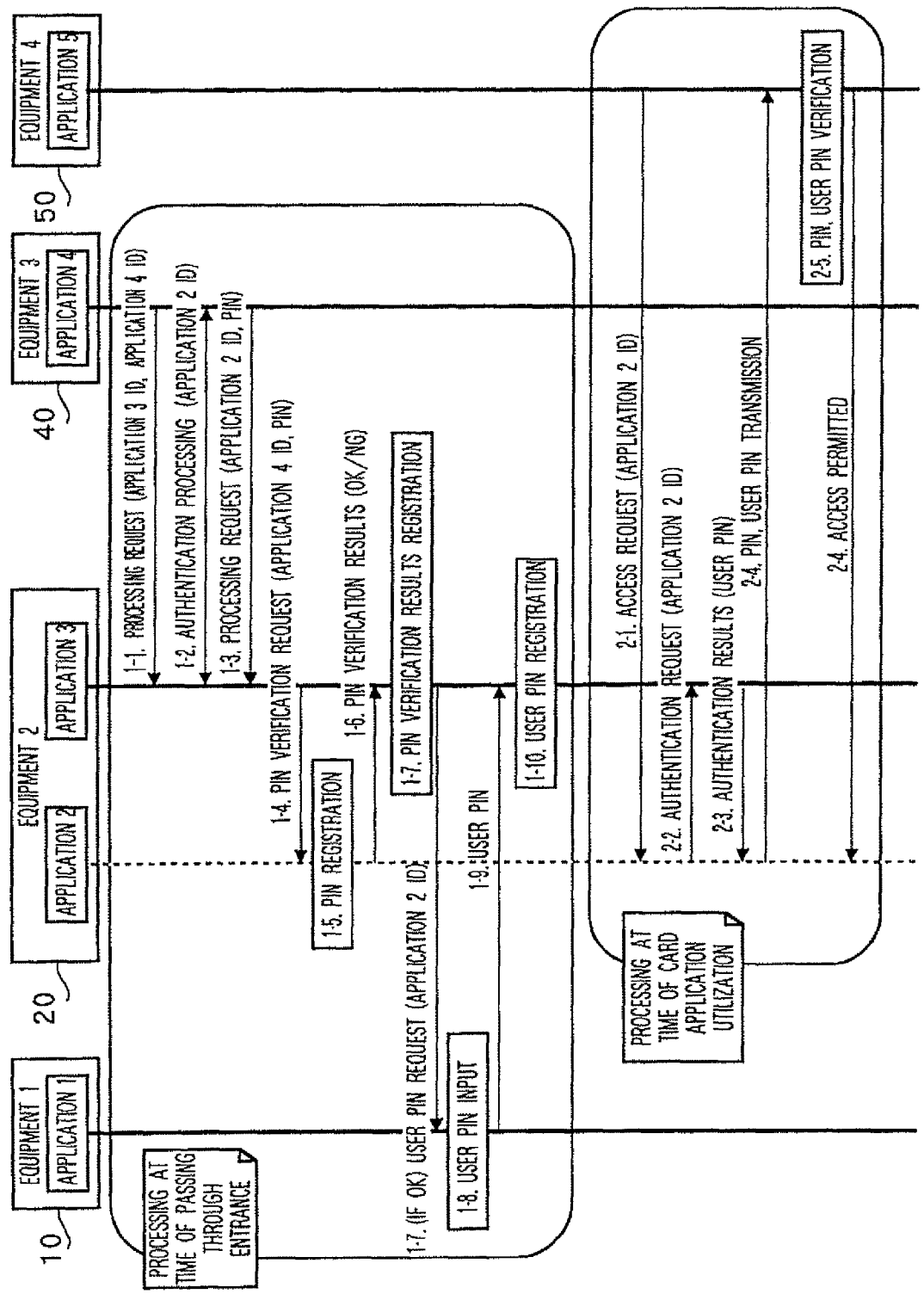
FIG. 22 is a sequence view showing the operation of a mobile telephone, combination card, gate and safe of Embodiment 4 of the present invention.

Further, FIG. 22 shows a sequence for the case where a card application (application 2) of the combination card (equipment 2) carries out a user PIN request and gate PIN verification, and key application (application 5) of the safe (equipment 4) carries out user PIN verification.

Figure 23:
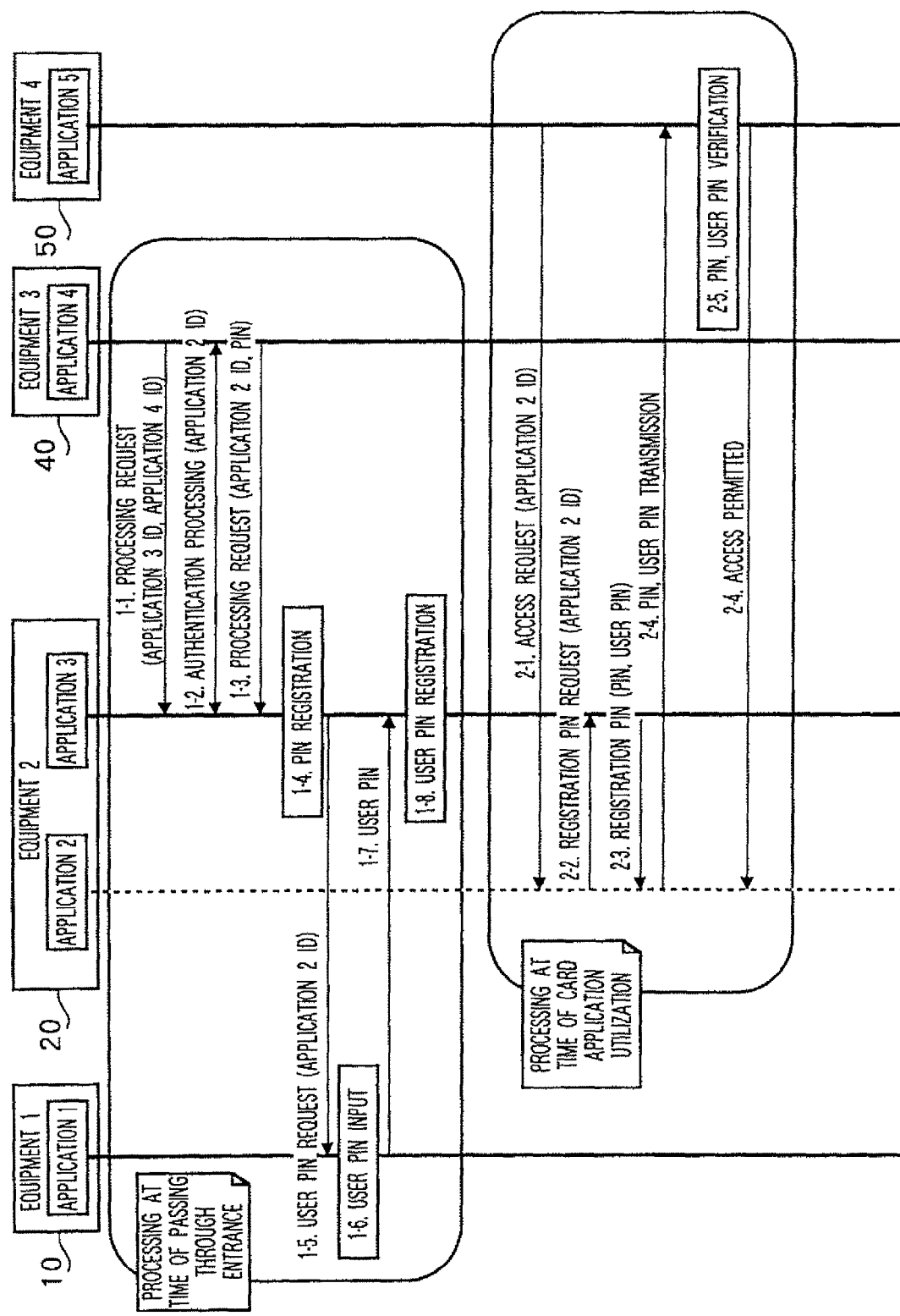
FIG. 23 is a sequence view showing the operation of a mobile telephone, combination card, gate and safe of Embodiment 4 of the present invention.

Moreover, FIG. 23 shows a sequence for the case where a authentication application (application 3) of the combination card (equipment 2) carries out a user PIN request, and key application (application 5) of the safe (equipment 4) carries out gate PIN verification and user PIN verification.

Figure 24:
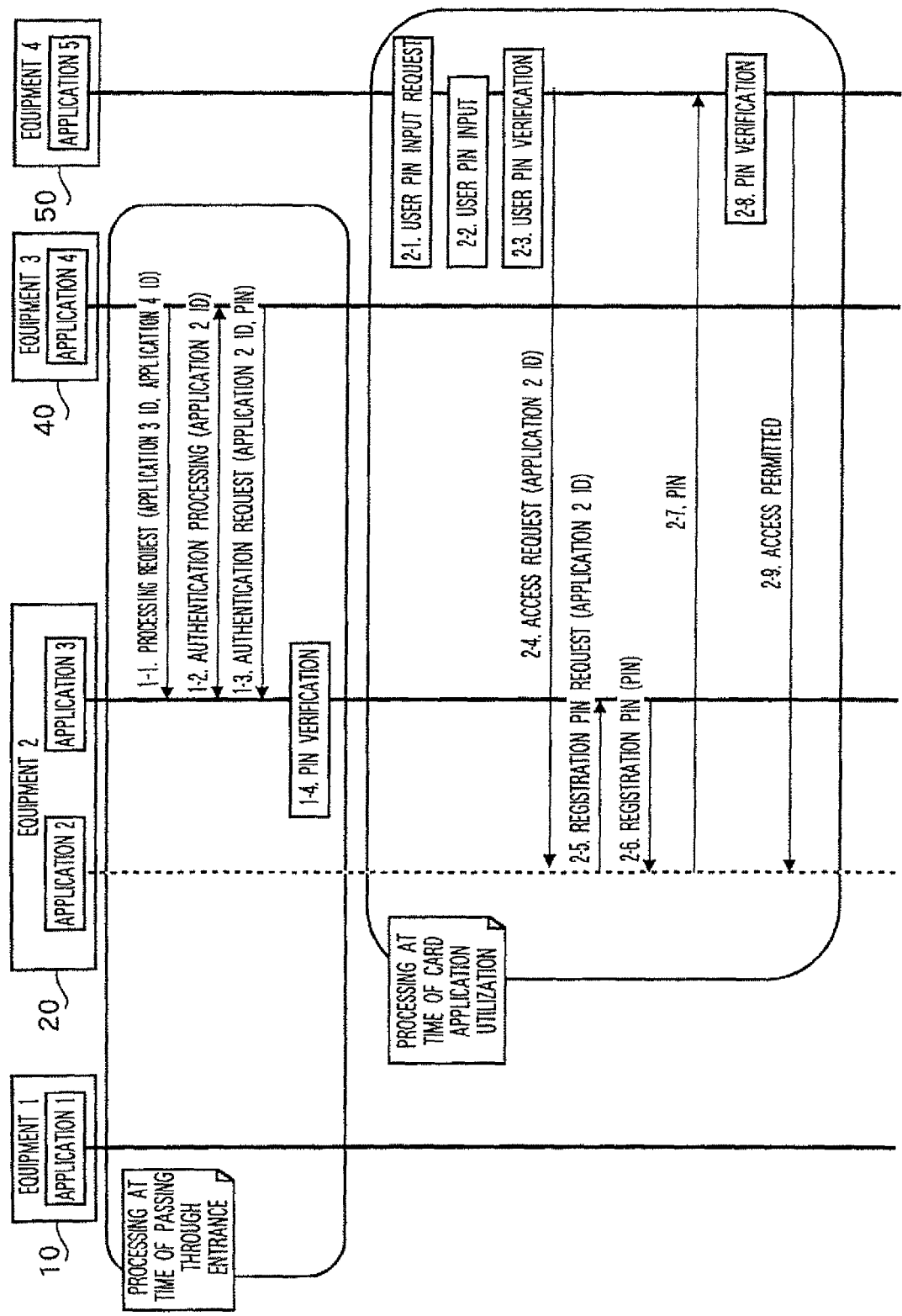
FIG. 24 is a sequence view showing the operation of a mobile telephone, combination card, gate and safe of Embodiment 4 of the present invention.

Further, FIG. 24 shows a sequence for the case where user PIN input is carried out from a safe (equipment 4), and a key application (application 5) of a safe (equipment 4) carries out gate pin verification and user PIN verification.

Figure 25:
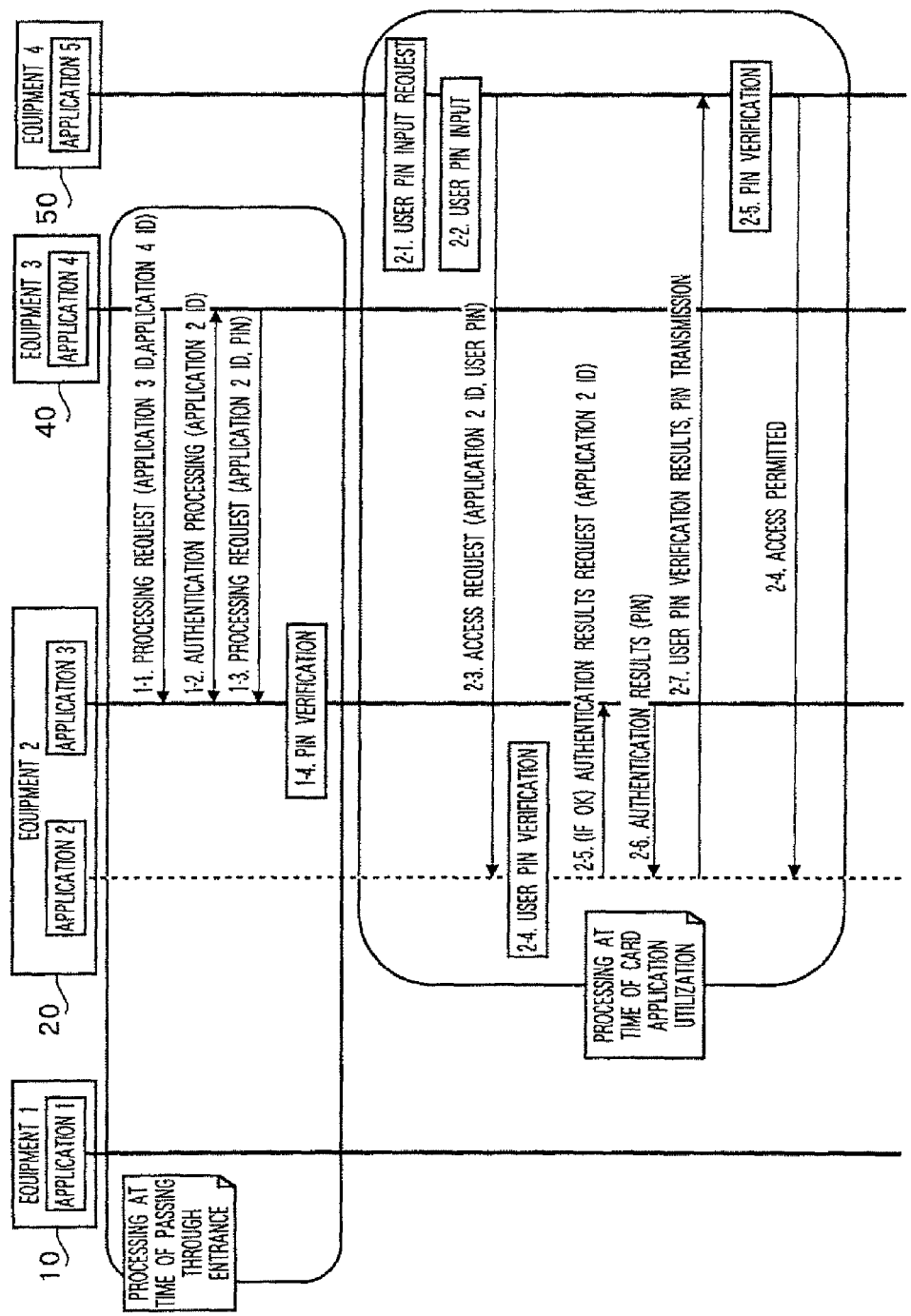
FIG. 25 is a sequence view showing the operation of a mobile telephone, combination card, gate and safe of Embodiment 4 of the present invention.

Moreover, FIG. 25 shows a sequence for the case where user PIN input is carried out from the safe (equipment 4), a card application (application 2) of the combination card (equipment 2) carries out user PIN verification, and key application (application 5) of the safe (equipment 4) carries out gate PIN verification.

Figure 26:
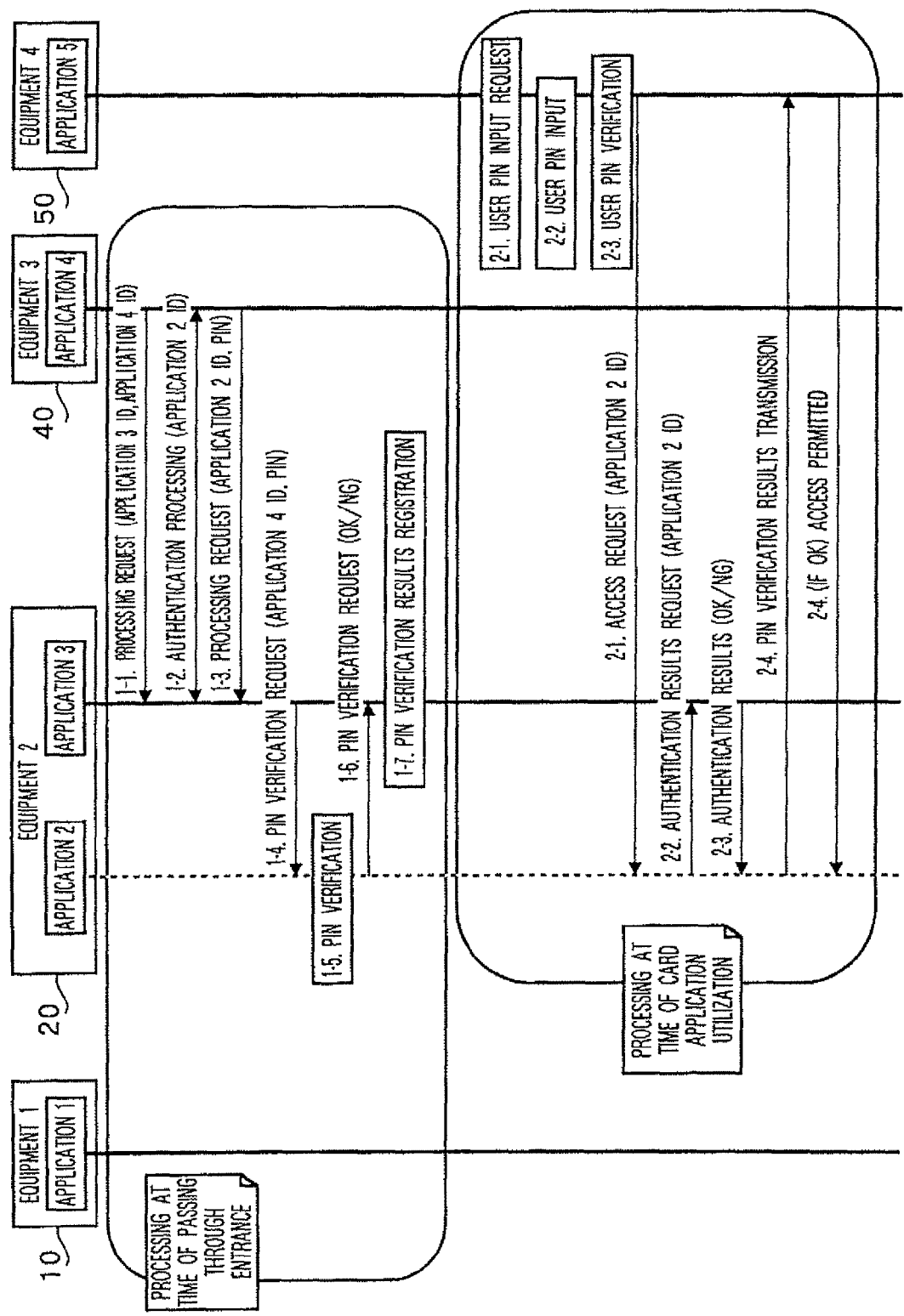
FIG. 26 is a sequence view showing the operation of a mobile telephone, combination card, gate and safe of Embodiment 4 of the present invention.

Further, FIG. 26 shows a sequence for the case where user PIN input is carried out from the safe (equipment 4), a card application (application 2) of the combination card (equipment 2) carries out gate PIN verification, and key application (application 5) of the safe (equipment 4) carries out user PIN verification.

In the event that the gate PIN is verified by the card application (application 2) of the combination card (equipment 2), when the gate PIN has changed, it is sufficient simply to change the gate PIN stored in the card. Further, it is also possible to carry out access control using the combination of the gate application (application 4) and the key application (application 5).

Moreover, in the event that the gate PIN is verified by the key application (application 5) of the safe (equipment 4), it is sufficient just to register gate PIN information at the safe at the time when a new safe (equipment 4) is added. Further, it is not necessary to change setting of the case when the safe is deleted.

Further, in the event that the user PIN is verified using the card application (application 2) of the combination card (equipment 2), when the user wishes to change the user PIN, it is sufficient just to change the user PIN stored in the combination card (equipment 2) and this can be completed without changing the user PIN at the equipment (for example, a safe) desiring the change. Moreover, completion is also possible without setting a user PIN at each door even in cases where a single user PIN corresponds to a plurality of equipment (doors, etc.). Further, as shown in FIG. 18, in the case that the user PIN is input in advance, verification can be carried out without the safe (equipment 4) at the time of input of the user PIN. A situation where re-input of the user pin takes place from holding up to the safe therefore does not occur.

Moreover, in the event that the user PIN is verified by the key application (application 5) of the safe (equipment 4), the user PIN is managed at the safe. It can therefore be easily understood how many users are registered.

Further, in this embodiment, equipment 4 is assumed to be a safe, and a key application is assumed as the card application but the equipment 4 may also be a video or set top box (STB), and the card application may be assumed to be a settlement card application, fee-paying broadcast picture-recording booking application, or fee-paying broadcast receiving operation application. As a result of doing this, services are also possible where settlement processing (settlement card application) via the STB (PC) cannot be achieved, or video picture recording booking (or cancellation) (fee-paying broadcast picture recording application) cannot be achieved if the key processing for entering is not performed correctly.

Further, in the event that the equipment 4 is a vehicle security module, it is also possible to provide services where a security alarm rings if a vehicle door is opened, a vehicle engine is started, or vehicle audio equipment of a vehicle is removed without a card application correctly performing opening key closing processing or without performing check-in processing correctly at the security module (equipment 4).

Further, in this embodiment, a description is given mainly of the case where an IC card is installed at a mobile telephone but the present invention is by no means limited in this respect. For example, it is possible to use various terminal apparatus and information processing apparatus such as PDAs (Personal Digital Assistants), mail terminals, compact personal computers, game equipment etc. in place of the mobile telephone. Further, use is also possible with IC cards that do or do not satisfy international standard specifications. The form of the security device may be card-shaped or chip-shaped, and embedding in the information processing apparatus is also possible. Further, the IC card may also have only a contact communication section.

Embodiment 5

Next, a description is given of Embodiment 5 of the present invention. In Embodiment 5, terminal applications which is possible to install or delete and setting of setting instructions are changed according to the communication scheme. The configuration itself is the same as that of Embodiment 1 shown in FIG. 1 and is described with reference to FIG. 1.

As shown in FIG. 1, in Embodiment 5, as in Embodiment 1, there is provided a configuration of a mobile telephone 10 that is a terminal (equipment 1) a chip-shaped combination card 20 installed in mobile telephone 10 that is an IC card (equipment 2), and gate 40 that is gate equipment (equipment 3).

In the case of Embodiment 5, the combination card 20 that is an IC card (equipment 2) has a non-contact communication section 22 having a short range wireless communication function compatible with a plurality of communication schemes, and changes terminal applications which is possible to install or delete and settings of setting instructions using the communication scheme.

Here, a description is given of an example where terminal applications and setting of setting commands are changed using different communication schemes for processing for entering and exiting a company.

FIG. 27 shows an example of an authentication information DE 25 taking the example of processing of entry and exit to and from a company of Embodiment 5.

In the example of FIG. 27, there are two communication schemes, independent communication scheme A such as ISO14443TypeA etc., and independent communication scheme B such as ISO14443TypeB etc. and the case of independent communication scheme A is shown where terminal application 1 ID (mailer for individual use) and terminal application 2 ID (game) are taken as terminal application IDs that are capable of being installed, setting instructions 5 ID of individual network settings, wallpaper, and normal call mode etc. are taken as setting instruction IDs capable of being installed, terminal application 3 ID (extension number viewing browser) is taken as a terminal application ID for deletion, and setting instructions 7 ID such as company network settings, wallpaper, and extension mode etc. that are settings for company use are taken as setting instruction IDs for deletion.

In the case of independent communication scheme B, terminal application 1 ID (mailer for company use) and terminal application 3 ID (browser for viewing extension numbers) exist as terminal application IDs that can be installed, and it is taken that setting instruction 7 ID (settings for company use: company network setting, wallpaper, extension mode) is taken as a setting instruction ID capable of being installed, terminal application 11D (mailer for individual use) and terminal application 2 ID (game) are taken as terminal application IDs for deletion, and setting instruction 5 ID (individual network settings, wallpaper, communication call mode) is taken as a setting instruction ID for deletion.

As a result, it is possible to change the settings according to the communication scheme even if an instruction comes from the same gate application 43 or regardless of the application ID.

For example, in the example in FIG. 27, ID1 of the DB table is taken to be for processing for the exiting, and ID2 is taken to be for processing for entering. It is also taken that the gate application ID is the same for entering of ID1 and exiting of ID2 but that the communications schemes are different, i.e. independent communication scheme A and independent communication scheme B. It is also possible for there to be no gate application ID, or for the ID to be the gate equipment ID rather than the gate application ID.

In the case of this example, a mailer (application 1) for individual use and a game (application 2) are taken as applications for individual use, and a mailer (application 4) for company use and browser (application 3) for viewing extension telephone numbers capable of accessing extension number data stored within combination card 20 exist as applications for company use, and can be deleted or installed at the entrance (2) and exit (1).

Further, settings instructions also exist that are for company use and individual use, so that, for example, settings for networks which is possible to access, wallpaper, and talk mode etc. can be switched over.

Next, a description is given of the operation with references to the drawings.

Figure 28:
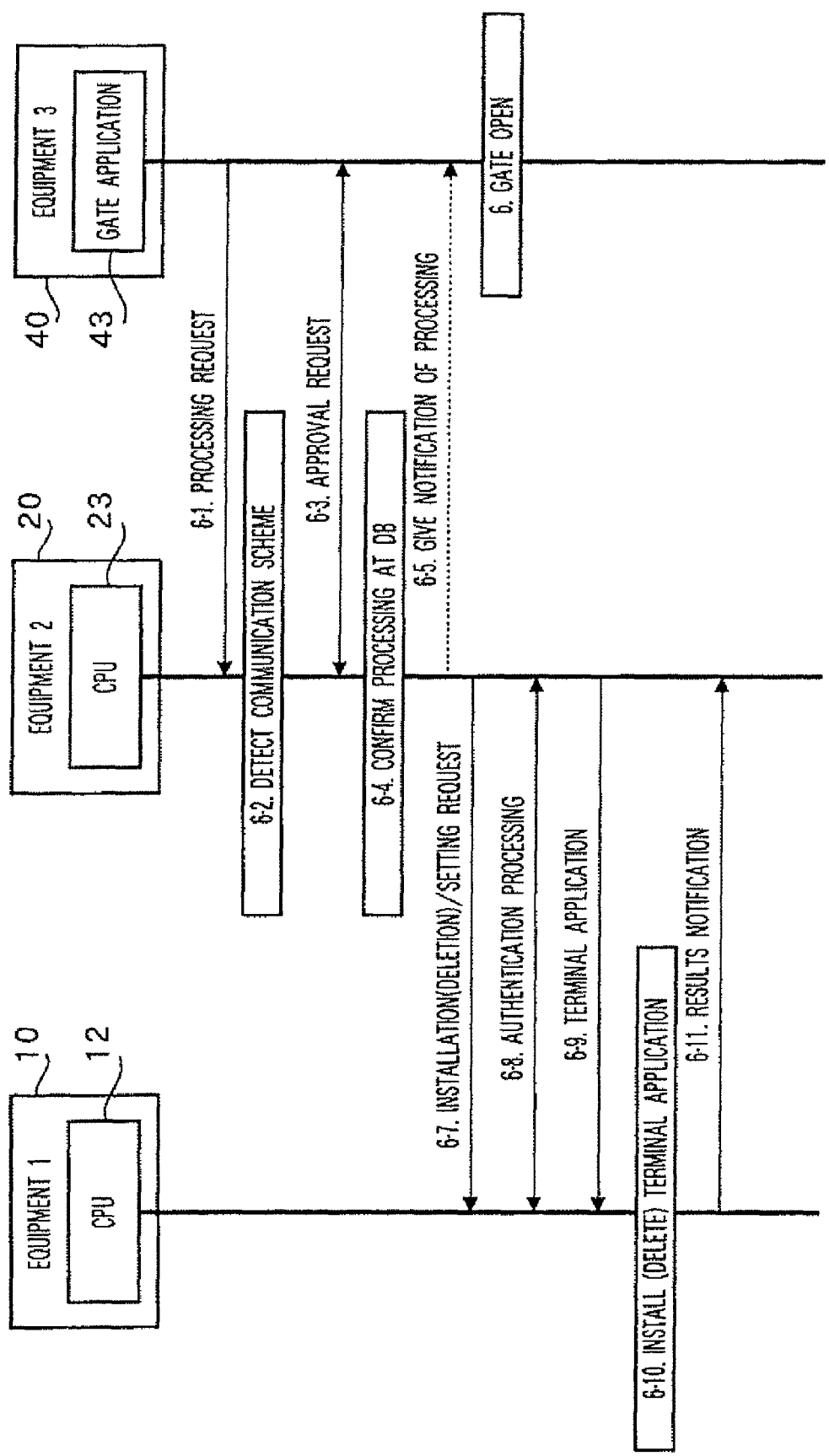
FIG. 28 is a sequence view showing the operation of a mobile telephone, combination card and gate of Embodiment 5.

FIG. 28 is a sequence view showing the operation of a mobile telephone, combination card and gate of Embodiment 5.

In the case of this embodiment, non-contact communication section (3) 22 of combination card 20 that is equipment 2 carries out non-contact communication with non-contact communication section (4) 41 of gate 40 that is equipment 3, and in the event that a processing request is sent from gate 40 that is equipment 3 to the combination card 20 that is the equipment 2 (6-1), CPU 23 of the combination card 20 detects the communication scheme of this non-contact communication (6-2), carries out authentication processing with the gate 40 that is the equipment 3 (6-3), refers to the authentication information of authentication information DB 25, and confirms the authentication processing (6-4).

CPU 23 of the combination card 20 notifies gate 40 that is the equipment 3 of authentication processing in the event that authentication processing is confirmed (6-5). As a result, at the gate 40, it is possible to confirm applications installed with respect to the combination card 20 that is equipment 2 and setting instructions. This notification can of course be omitted. Gate 40 then receives this processing notification and opens a gate corresponding to gate application 43 according to the communication scheme (6-6).

On the other hand, CPU 23 of the combination card 20 sends a setting request for terminal application ID and setting instruction ID which is possible to install or delete to the mobile telephone 10 that is equipment 1 via the contact communication section (2) 21 according to the detected communication scheme (6-7) and carries out authentication processing (6-8).

In the event that authentication is achieved, CPU 23 of the combination card 20 sends a terminal application ID and setting instruction ID for which installation or deletion is possible to the mobile telephone 10 that is equipment 1 via the contact communication section (2) 21 according to the detected communication scheme (6-9). At the mobile telephone 10, a terminal application ID and setting instruction ID that can be installed or deleted according to the communication scheme between the combination card 20 and the gate 40 are installed or deleted (6-10) according to instruction from CPU 23 of equipment 2, and combination card 20 is notified of the results (6-11).

As a result, it is possible to install the terminal application ID and setting instruction ID to the mobile telephone 10 according to the communication scheme between the combination card 20 and gate 40, or delete according to the communication scheme.

Authentication processing between combination card 20 and the mobile telephone 10 that is the equipment 1 may be carried out prior to a setting request for the terminal application ID and setting instruction ID capable of being installed or deleted. Further, authentication processing between the combination card 20 and the mobile telephone 10 is not necessary in the case of authentication processing at the time of installation of the combination card 20 in the mobile telephone 10 that is the equipment 1.

According to Embodiment 5, by installing at the mobile telephone 10 according to the communication scheme, or changing terminal applications to be deleted and setting instructions from the mobile telephone 10, it is possible to change functions of mobile telephone 10 not only according to location but also according to communication scheme.

In this embodiment, CPU 23 is in possession of functions for changing terminal applications and setting instructions which is possible to install or delete according to the communication scheme, but it is also possible for authentication application 24 to have these functions.

Embodiment 6

Next, a description is given of Embodiment 6 of the present invention. In Embodiment 6, a card application is changed to be valid or invalid (use inhibited) according to the communication scheme. The structure itself is the same as Embodiment 2 shown in FIG. 5 using a card application, Embodiment 3 shown in FIG. 10, and Embodiment 3 shown in FIG. 12, and is described with reference to FIG. 1.

In the event that combination card 20 that is equipment 2 has a non-contact communication section (3) 22 having a plurality of short range wireless communication functions, it is possible to change the card application to valid or invalid depending on the communication scheme. Here, "making the card application invalid" refers to a state where a response is not returned from the IC card even if, for example, an ISO7816 specification select command is sent to the IC card from the R/W (read/writer).

Here, there are cases where application is limited by short range wireless lines. For example, limiting may take place to applications in specific areas etc. such as ISO14443TypeA being a finance application, ISO14443TypeB being for applications directed towards the public, and JICSAP2.0 being directed towards traffic, etc.

In this way, by limiting access to the card application 28 of the combination card 20 from the terminal application 14 of the mobile telephone 10 according to the communication scheme, it is possible for the user to understand which card application 28 that is out of range is stored from the R/W (reader/writer) of the gate 40 etc. For example, the card application ID is publicly known. It is therefore possible to know the validity of the card application using the response from an IC card such as a combination card 20 etc. when an ISO7816 standard select command is sent, whatever the R/W (read/writer) is.

Namely, it is possible for an R/W (read/writer) for public service use to acquire personal information such as which credit card application this user is in possession of without the knowledge of the user.

In Embodiment 6, it is possible to set the application ID to invalid, i.e. use inhibit, according to the communication scheme.

FIG. 29 is a view showing an example of content of authentication information DB 25 of Embodiment 6.

In FIG. 29, in the event that the communication scheme is ISO14443TypeB, the application ID that is invalidated is the card application 3 ID (credit card) and in the event that the communication scheme is ISO14443TypeA, the invalidated application ID is card application 1 ID (driving license), while in the case that the communication scheme is a JICSAP2.0 high-speed command specification, the application ID to be invalidated is card application 3 ID (credit card).

Next, a description is given of the operation with reference to the drawings.

Figure 30:
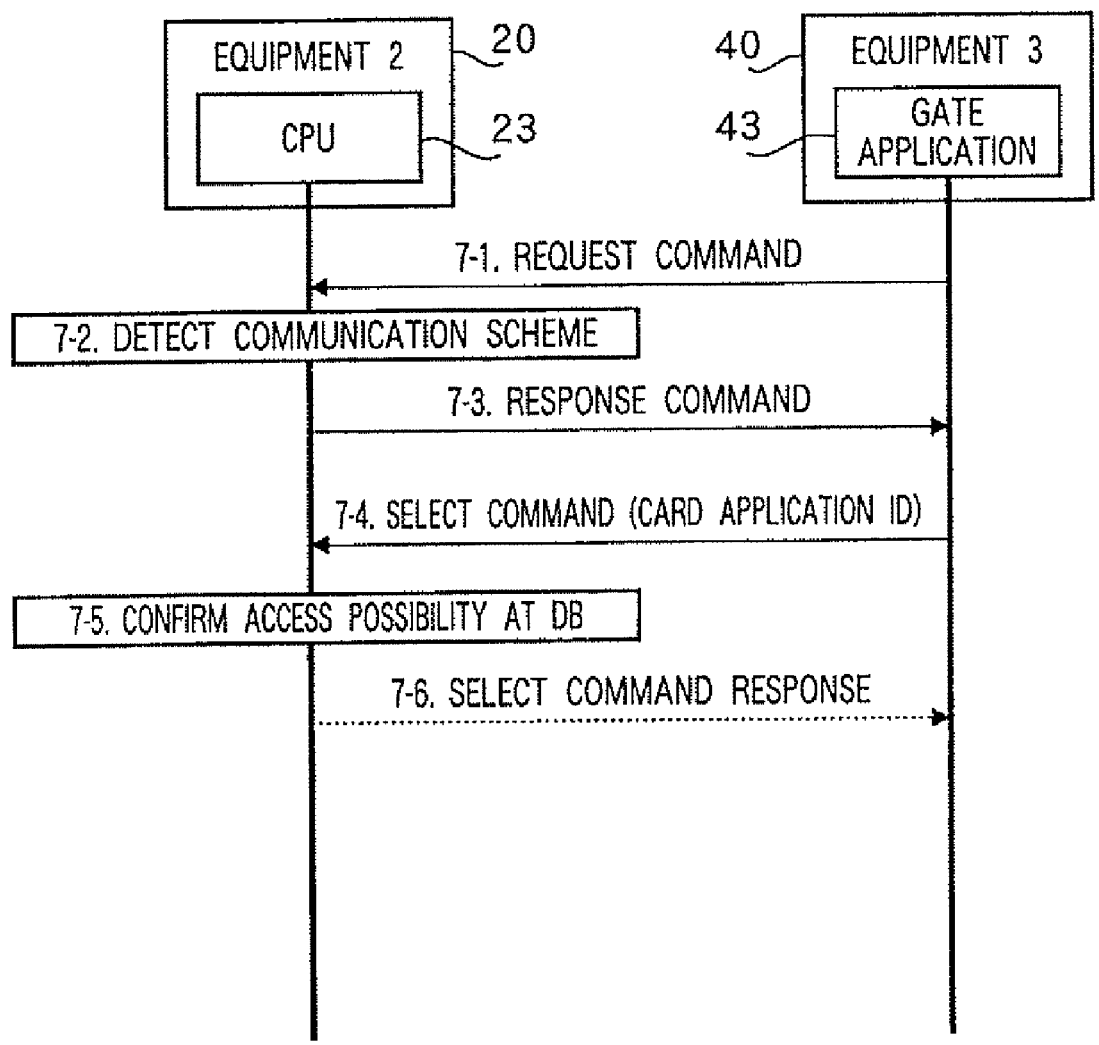
FIG. 30 is a sequence view showing the operation of a mobile telephone, combination card and gate of Embodiment 6.

FIG. 30 is a sequence view showing the operation of a mobile telephone, combination card and gate of Embodiment 6.

In the case of this embodiment, non-contact communication section (3) 22 of computer card 20 that is equipment 2 carries out non-contact communication with the non-contact communication section (4) 41 of gate 40 that is the equipment 3, and in the event that a request command is sent from gate 40 that is equipment 3 to combination card 20 that is equipment 2 (7-1), the CPU 23 of the combination card 20 detects the communication scheme of this non-contact communication (7-2), and in the event that the communication scheme cannot be detected, returns a response command (7-3).

In the event that a select command for the card application is then sent from the gate 40 that is equipment 3 (7-4), CPU 23 of the combination card 20 refers to authentication information DB 25 and confirms whether or not access is possible (7-5), and returns a select command response to the gate 40 that is the equipment 3 (7-6).

Namely, CPU 23 of the combination card 20 refers to the authentication information of FIG. 29 stored in authentication information DB 25, and if the card application ID designated by the gate 40 is not designated as an application ID corresponding to that invalidating the communication scheme between the combination card 20 and gate 40, a normal response is returned. If this is designated, an error response is returned to the gate 40 as a select command response.

For example, in the event that the communication scheme between combination card 20 and gate 40 is ISO14443TypeB and the card application ID designated by gate 40 is card application 3 ID (credit card), when the content of the authentication information DB 25 shown in FIG. 29 is referred to, as the application ID is invalidated, computer card 20 returns an error response to gate 40 of a select command response. The communication scheme is the same as the case of the high-speed command specification of JICSAP2.0.

With regards to this, in the event where the communication scheme for between the combination card 20 and the gate 40 is ISO14443TypeB and the card application ID designated by the gate 40 is card application 1 ID (driving license), upon referring to the content of authentication information DB 25 shown in FIG. 29, there is no correspondence with an application ID to be made invalid and the combination card 20 therefore returns a normal response to the gate 40 as a select command response.

As a result, the card application 28 changes between effective and invalid (use-inhibited) according to the communication scheme between the combination card 20 and the gate 40. There are then cases where terminal application 14 of the mobile telephone 10 is capable of accessing the card application 20 at the combination card 20 and is not capable of access according to the communication scheme between the combination card 20 and gate 40.

According to Embodiment 6, as it is possible to set an application ID invalidating the terminal application 27 within the combination card 20 according to the communication scheme between the combination card 20 and the gate 40, it is possible to limit access to an IC card such as a combination card 20 etc. according to the communication scheme. It is therefore possible for what kind of application is stored by the user outside of the field to not be known at the R/W (reader/writer) of the gate etc.

In Embodiment 6, a description is given of designating application IDs to be invalidated according to the communication scheme. However, by combining this Embodiment 6 and Embodiment 5 described previously and using per detection and authentication processing of communication scheme between the combination card 20 that is equipment 2 and gate 40 that is equipment 3, is it possible to simultaneously change the terminal application IDs and setting instruction IDs to be installed or deleted and the application IDs to be invalidated, according to the communication scheme.

Further, in Embodiment 6, a function is provided for setting application IDs to be made invalid for the terminal application 27 within the combination card according to the communication scheme between the combination card 20 and gate 40 at the CPU of the combination card 20 that is equipment 2 but it is also possible for this function to be in the possession of the authentication application 24 etc. of combination card 20.

Embodiment 7

Next, a description is given of Embodiment 7 of the present invention. In Embodiment 7, if a setting providing validation between combination card 20 that is the equipment 2 and mobile telephone 10 that is equipment 1 is correctly invalidated on a previous occasion, then on this occasion, authentication between gate 40 that is equipment 3 and combination card 20 that is equipment 2 is permitted.

Figure 31:
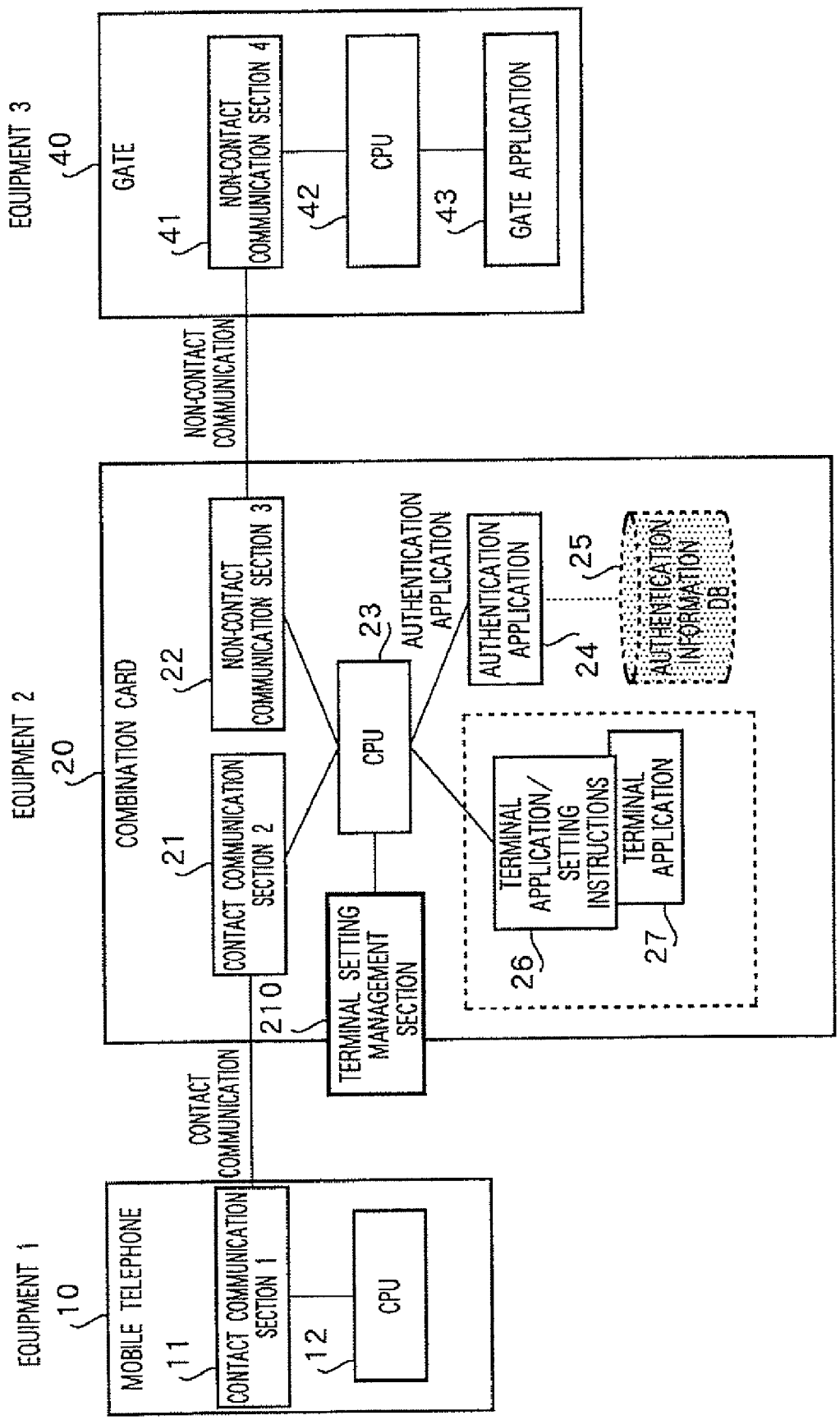
FIG. 31 is a block view showing a configuration of Embodiment 7.

FIG. 31 is a block view showing a configuration of Embodiment 7.

In Embodiment 7, terminal setting management section 210 is provided at combination card 20 that is equipment 2, and if a setting validating mobile telephone 10 that is equipment 1 and combination card 20 that is equipment 2 for the previous time is correctly invalidated by terminal setting management section 210, on this occasion, authentication between gate 40 that is equipment 3 and combination card 20 that is equipment 2 is permitted. Terminal setting management section 210 may be integral with authentication application 24 or may be integral with CPU 23. Other aspects of the configuration as the same as for Embodiment 1 shown in FIG. 1 etch, are given the same numerals as the configuration of FIG. 1 to omit the explanation.

An example of data set in the authentication information DB 25 of Embodiment 7 is shown in FIG. 32.

Data for ID1 and ID2 is set in authentication information DB 25.

In the case of ID1, www.app.co.jp/gate1, a communication scheme of ISO14443TypeB, an effective time of 5:00 hours, an installable terminal application ID and setting instruction ID of terminal application 3 ID (extension number viewing browser) and setting instruction 7 ID (setting for company use: company network setting, wallpaper, extension mode), and a deletable terminal application ID and setting instruction ID of terminal application 2 ID (game) and setting instruction 5 ID (individual network setting, wallpaper, normal calling mode) are set.

Further, in the case of ID2, www.app.co.jp/gate2, a communication scheme of UWB (Ultra WideBand), an effective time of no limit, an installable terminal application ID and setting instruction ID of terminal application 2 ID (game) and setting instruction 5 ID (individual network setting, wallpaper, normal calling mode), a deletable terminal application ID and setting instruction ID of terminal application 3 ID (extension number viewing browser) and setting instruction 7 ID (setting for company use: network setting for a company, wallpaper, extension mode) are set.

An example of data set in the terminal setting management section 210 of Embodiment 7 is shown in FIG. 33.

Figure 34:
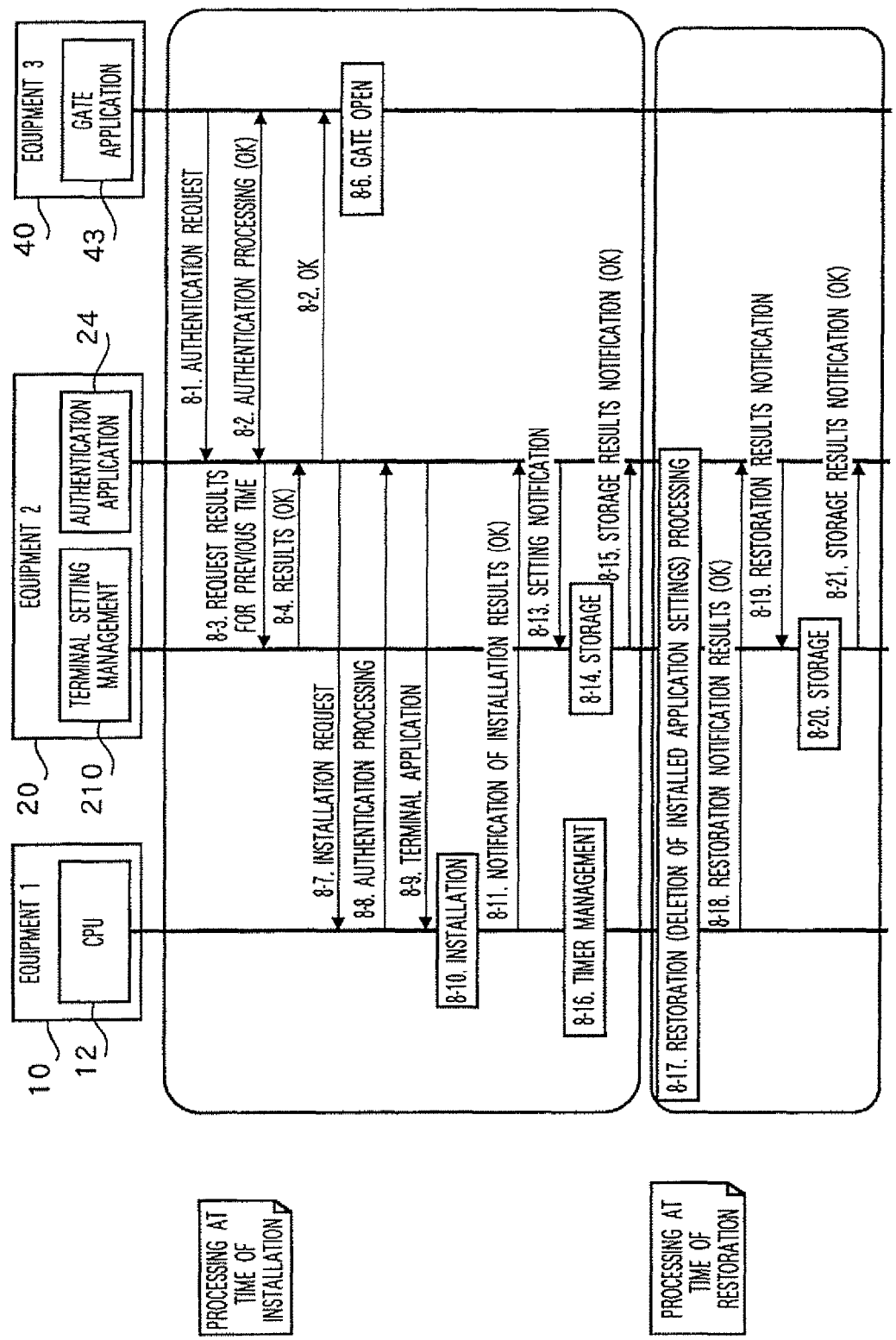
FIG. 34 is a sequence view showing the operation of a mobile telephone, combination card and gate of Embodiment 7.

At the data set at terminal setting management section 210, data such as an ID for equipment 3 of www.app.co.jp/gate-terminal1, a gate application ID of www.app.co.jp/gateapp1, an equipment 1 ID of www.app.co.jp/terminal1, a time stamp at the time of setting of 2004/12/24 15:32:02, an effective time of 5:00 hours, an ID for authentication information DB 25 of 1, a terminal application ID for the time of installation of terminal application 3 ID (extension number viewing browser), an installed setting instruction ID of setting instruction 7 ID (settings for company use: company network setting, wallpaper, extension mode), a deleted terminal application ID of terminal application 2 ID (game), a deleted setting instruction ID of setting instruction 5 ID (individual network settings, wallpaper, communication call mode), and setting processing results of normal, taken as ID1 is stored from the authentication application 24 to the terminal setting management section 210 as a result of setting notification processing (8 to 14 of FIG. 34).

Other than this, with data set in terminal setting management section 210, as shown in FIG. 33, a time stamp at the time of restoration notification of 2004/12/24 20:32:02, and restoration processing results of normal are stored as a result of restoration results notification processing from authentication application 24 to terminal setting management section 210 based on restoration notification results for from CPU 12 of equipment 1 to authentication application 24 of equipment 2 (8 to 20 of FIG. 34).

Next, a description is given of the operation with reference to the drawings.

FIG. 34 is a sequence view showing the operation of a mobile telephone, combination card and gate of Embodiment 7.

First, describing the processing from the time of installation, in the case of this embodiment, non-contact communication section (3) 22 of combination card 20 that is equipment 2 carries out non-contact communication with non-contact communication section (4) 41 of gate 40 that is equipment 3. In the event that an authentication request is sent from the gate application 43 of gate 40 that is equipment 3 to authentication application 24 of combination card 20 that is equipment 2 (8-1), authentication application 24 of combination card 20 carries out authentication processing with gate 40 that is equipment 3 (8-2).

In the event that the authentication processing is OK, authentication application 24 of combination card 20 makes a request for the results for the previous time to terminal setting management section 210 (8-3). If the results for the previous time are OK, terminal setting management section 210 replies that the results for the previous time are OK to authentication application 24 (8-4).

In doing so, authentication application 24 notifies gate application 43 of gate 40 of the result OK for the previous time (8-5), and the gate application 43 of gate 40 opens the gate (8-6). In the event that the setting of the validation for the previous time is not invalidated correctly while acquiring the results for terminal setting for the previous time during authentication using non-contact communication between combination card 20 that is the equipment 2 and gate 40 that is equipment 3, authentication is not permitted.

Further, in the event that the previous result is OK, authentication application 24 of the combination card 20 sends an installation request to the mobile terminal 10 that is the equipment 1 (8-7), and executes authentication processing with CPU 12 of mobile terminal 10 (8-8).

In the event that authentication processing is OK, authentication application 24 of the combination card 20 sends terminal application 27 to the mobile terminal 10 that is equipment 1 (8-9), and the mobile terminal 10 receives and installs this terminal application 27 (8-10).

In the event that it is possible to install the terminal application 27 received from the combination card 20, CPU 12 of the mobile terminal 10 gives notification of the installation results of OK to the authentication application 24 of the combination card 20 (8-11), and the authentication application 24 provides setting notification on the terminal setting management section 210 (8-13).

Terminal setting management section 210, using the setting notification from authentication application 24, stores an ID shown in FIG. 33, the ID of equipment 3, the gate application ID, the ID of equipment 1, a time stamp for the time of setting, an effective time, an ID for the authentication information DB, a terminal application ID for the time of installation, an installed setting instruction ID, a deleted setting instruction ID, and setting processing results (8-14), and after storage of this data, notifies the authentication application 24 of the storage results of OK (8-15).

On the other hand, at mobile terminal 10, timer management is carried out (8-16) after notifying the authentication application 24 of the combination card 20 of the installation results of OK (8-11). Here, in place of carrying out this timer management, after the terminal setting management section 210 of the combination card 20 notifies the authentication application 24 of the storage results (8-15), the authentication application 24 carries out timer management, and a restoration instruction is carried out from the authentication application 24 of equipment for the CPU 12 of equipment 1 before restoration processing (3-17) at the mobile terminal 10 of equipment 1 described later. The processing at the time of installation is then complete.

On the other hand, at the mobile terminal 10 that is equipment 1, in the event that restoration processing, i.e. deletion processing for installed terminal applications and setting instructions is carried out (8-17), CPU 12 of the mobile terminal 10 gives notification that the restoration results are OK to authentication application 24 of the combination card 20 (8-18).

Here, during processing at the time of restoration, the installed terminal application is deleted but, for example, in cases where exit processing is performed within an effective time, etc., there are cases where the installed terminal applications are already deleted. In such cases, restoration results of OK or deletion complete is carried out for the authentication application 24 of the combination card 20.

The authentication application 24 of the combination card 20 that is equipment 2 receives notification of the restoration results of OK from the CPU 12 of the mobile terminal 10 and transmits the restoration results notification to the terminal setting management section 210 (8-19).

At terminal setting management section 210, when restoration results notification is received from the authentication application 19, for example, a time stamp for the time of restoration notification shown in FIG. 33 and restoration processing results are stored in authentication information (8-20), and if the storage results are OK, authentication application 24 is notified of the storage results of OK (8-21).

In order to bring about greater security, it is also possible to enter authentication processing before or after notification processing (8-18) of the restoration results of OK for the authentication application 24 of the combination card 20 that is the equipment 2 from the CPU 12 of the mobile terminal 10.

According to Embodiment 7, if, on the previous occasion, validation settings between the combination card 20 that is the equipment 2 and the mobile telephone 10 that is the equipment 1 is correctly invalidated, on this occasion, on the one hand, authentication of the gate 40 that is equipment 3 and the combination card 20 that is equipment 2 is permitted, while on the previous occasion, a setting of validation between the combination card that is the equipment 2 and the mobile telephone 10 that is the equipment 1 is not correctly invalidated, on this occasion, it is ensured that authentication of the gate 40 that is equipment 3 and the combination card 20 that is equipment 2 is not permitted. This means that on every occasion it is possible to permit authentication between the equipment 3 and the equipment 2 from confirming whether or not validation settings between the equipment 1 and the equipment 2 have been correctly invalidated.

Further, in this Embodiment 7, terminal setting management section 210 stores the setting instructions and installation that are the set content in the authentication information while managing the results of the terminal setting for the previous time, outputs a deletion (invalidation) instruction to confirm deletion after an effective time, receives deletion management notification based on this effective time for which the timer is managed by the mobile terminal 10 that is the terminal 1, and stores setting content etc. indicated in FIG. 33 that is the setting for the previous time in authentication information as history. It is therefore possible to provide history for the previous time in a reliable manner by referring to this authentication information at the time of the next gate authentication.

In this Embodiment 7, a description is given where the terminal setting management section 210 is provided separately from the authentication application 24 but the terminal setting management section 210 may also be provided integrally with, i.e. as a function of, the authentication application 24 or may be provided integrally with the CPU 23, i.e. as one function of the CPU 23.

Embodiment 8

Next, a description is given of Embodiment 8 of the present invention. In Embodiment 8, in order to ensure the memory capacity etc. of a mobile telephone that is equipment 1, in the event that the terminal application of the mobile telephone is suspended, the combination card that is equipment 2 is reinstalled during the setting cancellation processing with regards to this terminal application.

Figure 35:
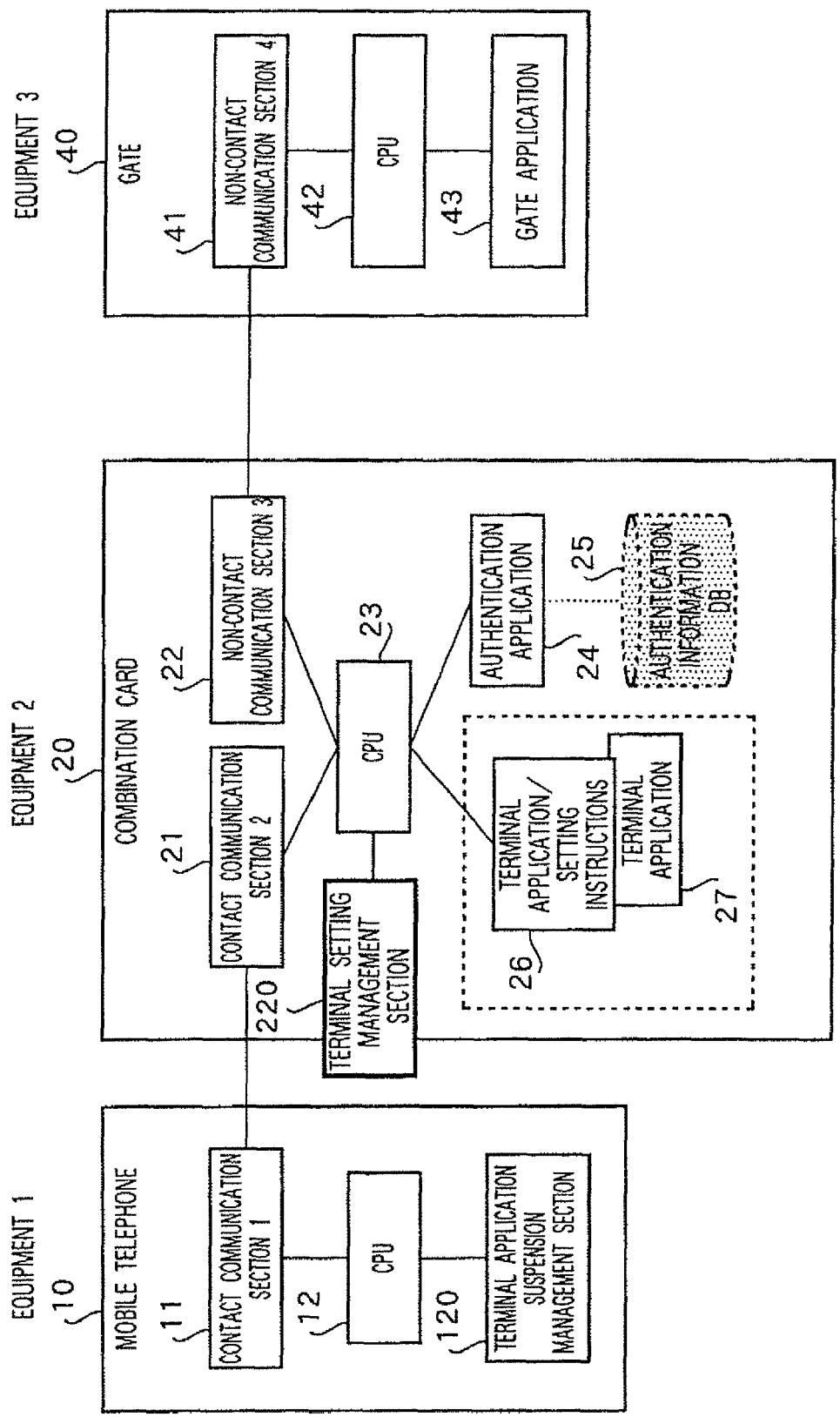
FIG. 35 is a block view showing a configuration of Embodiment 8.

FIG. 35 is a block view showing a configuration of Embodiment 8.

In FIG. 35, in the case of Embodiment 8, mobile telephone 10 that is equipment 1 has a terminal application suspension management section 120 managing suspension of terminal applications at the mobile telephone 10. Further, combination card 20 that is equipment 2 has terminal setting management section 220 managing setting of the terminal while managing suspension of the terminal application at mobile telephone 10. Other aspects of the configuration are the same as shown in FIG. 1 etc., are given the same reference numerals to omit explanation.

Namely, in Embodiment 8, in the event of suspension of the terminal application from the mobile telephone 10, at the time of receiving an installation request from the combination card 20 that is the equipment 2, in the event that there is little capacity at terminal memory (not shown) of mobile telephone 10 or the new terminal application 27 cannot be installed, authentication is carried out using the terminal setting management section 220 and the terminal application suspension management section 120. If this authentication is successful, the terminal application installed at the mobile telephone 10 and the data held by this terminal application are stored in a secure area that the terminal setting management section 220 can only access from the terminal application suspension management section 120 of the equipment 1, for example, a tamper region of IC card 20 or an encrypted flash memory area of the IC card 20, etc. Further, it is also possible to generate a key at the time of authentication, and encrypt and save based on this key information.

Assigning and holding an order of priority to the terminal applications at equipment 1 or designating applications to be saved, for example, contained in installation requests from the combination card 20 that is the equipment 2 exist as methods for selecting terminal applications to save at the mobile telephone 10 that is equipment 1.

On the other hand, at the time of restoration, at the time of a setting interruption instruction from the combination card 20 that is the equipment 2, if there is an application that has been saved to the combination card 20, after setting terminal processing confirmation, a restoration instruction for the saved terminal application is sent and authentication processing for the restoration is carried out. Authentication is then carried out between the terminal setting management section 220 and the terminal application suspension management section 120, and if this authentication is successful, the saved terminal application and this data are sent to the terminal application suspension management section 120, the terminal application suspension management section 120 re-installs this terminal application, and the terminal application data is restored.

In this Embodiment 8 also, as with Embodiment 7, results for terminal settings for the previous time are acquired at the time of authentication using non-contact communication between the combination card 20 that is the equipment 2 and the gate that is the equipment 3, and it is then of course also possible to ensure that authentication between the combination card 20 that is the equipment 2 and the gate that is the equipment 3 is permitted on this occasion only in the event that the setting of validation between equipment 1 and equipment 2 the previous time has been correctly invalidated.

Next, a description is given of the operation with reference to the drawings.

Figure 36:
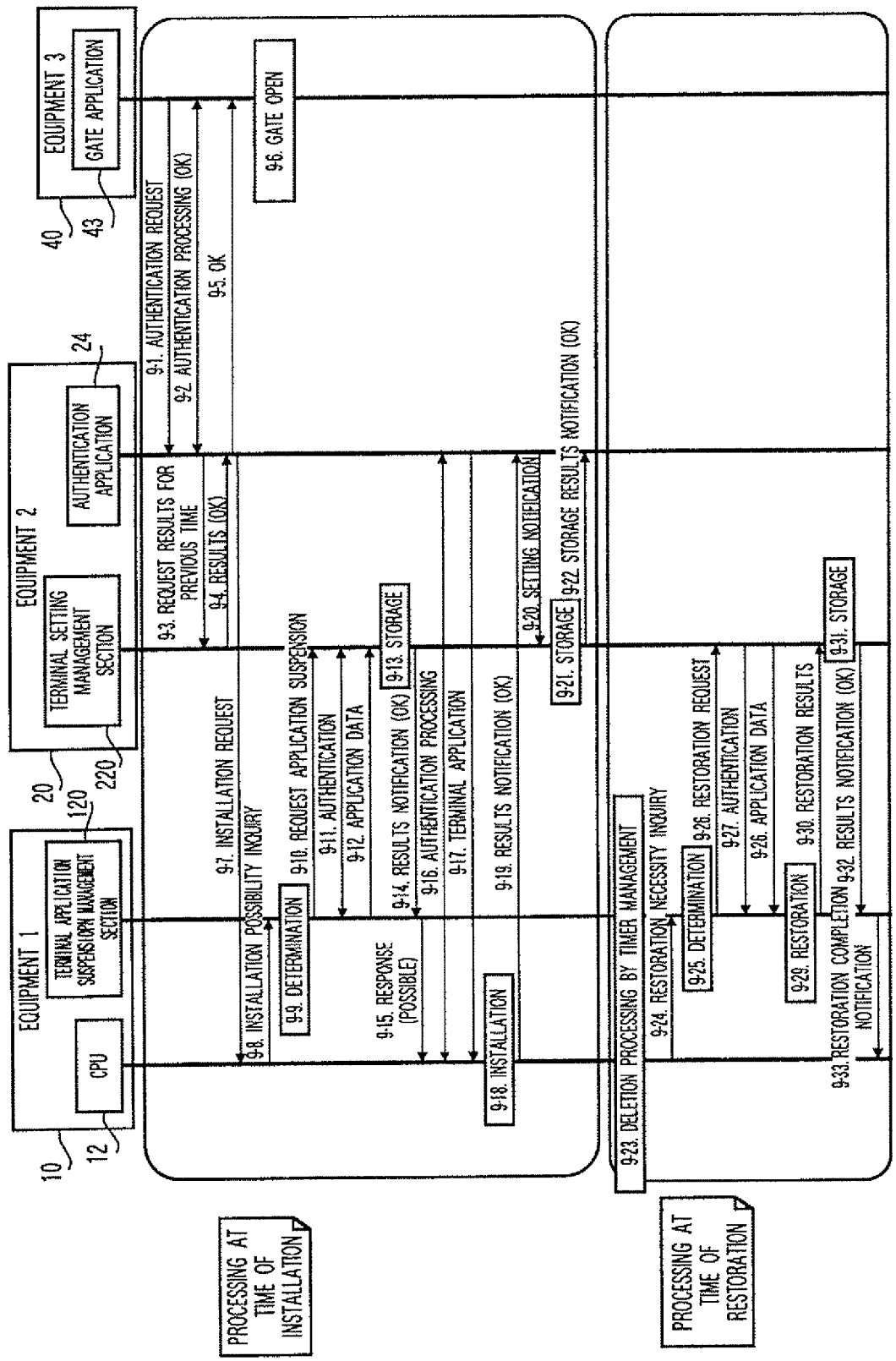
FIG. 36 is a sequence view showing the operation of a mobile telephone, combination card and gate of Embodiment 8.

FIG. 36 is a sequence view showing the operation of a mobile telephone, combination card and gate of Embodiment 8.

First, describing the processing from the time of suspension of the terminal application and its data, in the case of this embodiment, non-contact communication section (3) 22 of combination card 20 that is equipment 2 carries out non-contact communication with non-contact communication section (4) 41 of gate 40 that is equipment 3. In the event that an authentication request is sent from the gate application 43 of gate 40 that is equipment 3 to authentication application 24 of combination card 20 that is equipment 2 (9-1), CPU 23 of combination card 20 carries out authentication processing with gate 40 that is equipment 3 (9-2).

In the event that the authentication processing is OK, authentication application 24 of combination card 20 makes a request for the results for the previous time to terminal setting management section 220 (9-3). If the results for the previous time are OK, terminal setting management section 220 replies that the results for the previous time are OK to authentication application 24 (9-4).

In doing so, authentication application 24 notifies gate application 43 of gate 40 of the result OK for the previous time (9-5), and the gate application 43 of gate 40 opens the gate (9-6). In the event that the setting of the validation for the previous time is not invalidated correctly while acquiring the results for terminal setting for the previous time during authentication using non-contact communication between combination card 20 that is the equipment 2 and gate 40 that is equipment 3, authentication is not permitted.

Further, in the event that it is determined that the previous result is OK, authentication application 24 of the combination card 20 sends an installation request to the mobile terminal 10 that is the equipment 1 (9-7).

In doing so, CPU 12 of mobile terminal 10 interrogates terminal application suspension management section 120 as to whether or not installation is possible (9-8), and determines whether installation is possible or not for the terminal application suspension management section 120. In the event that installation is possible, terminal application suspension management section 120 sends an application suspension request to the terminal setting management section 220 of the combination card 20 (9-10) and carries out authentication processing between the terminal application suspension management section 120 and the terminal setting management section 220 (9-11).

In the event that the authentication results are OK, terminal application suspension management section 120 sends the terminal application to be saved and its data from the mobile telephone 10 to, for example, terminal setting management section 220 on the side of the combination card 20 (9-12), and the terminal application to be saved and its data are stored at the terminal setting management section 220 (9-13).

In the event that this storage processing finishes safely, terminal setting management section 220 of the combination card 20 sends notification results of storage OK to terminal application suspension management section 120 of mobile terminal 10 (9-14), and terminal application suspension management section 120 returns a response that this is possible to CPU 12 (9-15).

In doing so, CPU 12 of mobile terminal 10 executes authentication processing with the authentication application 24 of the computer card 20 (9-16), and in the event that the authentication processing is OK, the terminal application to be newly installed is sent from authentication application 24 of the combination card 20 to CPU 12 of the mobile telephone 10 (9-17), and the transmitted terminal application is received and installed (9-18).

In the event that it is possible to install the terminal application 27 received from the combination card 20, CPU 12 of the mobile telephone 10 gives notification of the installation results of OK to the authentication application 24 of the combination card 20 (9-19), and the authentication application 24 provides setting notification on the terminal setting management section 220 (9-20).

Terminal setting management section 220, as in Embodiment 7, using the setting notification from authentication application 24, stores an ID shown in FIG. 33, the ID of equipment 3, the gate application ID, the ID of equipment 1, a time stamp for the time of setting, an effective time, an ID for the authentication information DB, a terminal application ID for the time of installation, an installed setting instruction ID, a deleted setting instruction ID, and setting processing results (9-21).

After storing this data, terminal setting management section 220 gives notification that the storage results are OK to authentication application 24 (9-22). Here, at mobile telephone 10, processing at the time of saving a previously saved terminal application to combination card 20 and installing a new terminal application is complete. As in Embodiment 7, at combination card 20, the terminal setting management section 220 may of course be integral with the authentication application 24 or CPU 23.

Next, a description is given of processing at the time of restoration.

Processing at the time of restoration is such that the CPU 12 of the mobile terminal 10 that is the equipment 1 first carries out processing to delete a terminal application installed by timer management (9-23), and in the event that this deletion processing is complete, the terminal application suspension management section 120 carries out interrogation as to whether restoration is necessary or unnecessary (9-24).

Terminal application suspension management section 120 then receives this interrogation and determines whether restoration is necessary or unnecessary (9-25), and in the event that the terminal application is saved and restoration is necessary, a restoration request is sent to terminal setting management section 220 of the combination card 20 (9-26) and authentication processing is carried out between the terminal application suspension management section 120 and terminal setting management section 220 (9-27).

In the event that the result of this authentication processing is that authentication is OK, terminal setting management section 220 sends saved data for the terminal application and this terminal data to terminal application suspension management section 120 (9-28), the terminal application suspension management section 120 then receives data for this saved terminal application and terminal data, installs this in memory etc. and performs restoration (9-29), and sends the degeneration results to the terminal setting management section 220 (9-30).

In doing so, terminal setting management section 220 stores restoration results from terminal application suspension management section 120, for example, in authentication information etc. shown in FIG. 33 (9-31) and if the storage results are OK, terminal application suspension management section 120 is notified that the storage results are OK (9-32). The terminal application suspension management section 120 notifies the CPU 12 of completion of reproduction (9-33), and processing at the time of restoration is complete.

Authentication processing for between terminal application suspension management section 120 and terminal setting management section 220 (9-11) may be before an application suspension request (9-10) from the terminal application suspension management section 120 to the terminal setting management section 220, and authentication processing (9-16) between CPU 12 of mobile telephone 10 and authentication application 24 of combination card 20 may also be before an installation request (9-7) from the authentication application 24 to the CPU 12 of the mobile telephone 10. Authentication processing for between the terminal application management section 120 and authentication application 24 in processing at the time of restoration (9-24) may also be executed before receiving an interrogation as to whether or not restoration is necessary from CPU 12. Further, in the event that an authenticated state is adopted at the time where combination card 20 that is equipment 2 is installed in mobile telephone 10 that is equipment 1, the authentication processing (9-11 and 9-27) for between the terminal application suspension management section 220 and the terminal setting management section and the authentication processing (9-16) for between CPU 12 of mobile telephone 10 and authentication application 24 is not necessary and may be omitted.

Further, in the event that a timer function is present at combination card 20 that is equipment 2, time management is carried out at combination card 20, and upon the setting time, before deletion processing (9-23) by time management due to the CPU 12 of equipment 1, a deletion instruction is sent from equipment 2 to equipment 1 based on the timer function, and deletion processing may then be carried out using this deletion instruction at equipment 1. In this case, authentication processing (9-25) between terminal setting management section 220 of equipment 2 and terminal application suspension management section 120 of equipment 1 may also be carried out before a deletion instruction from equipment 2 to equipment 1, or may also be carried out before deletion processing (9-23) using timer management by CPU 12 of equipment 1.

Figure 37:
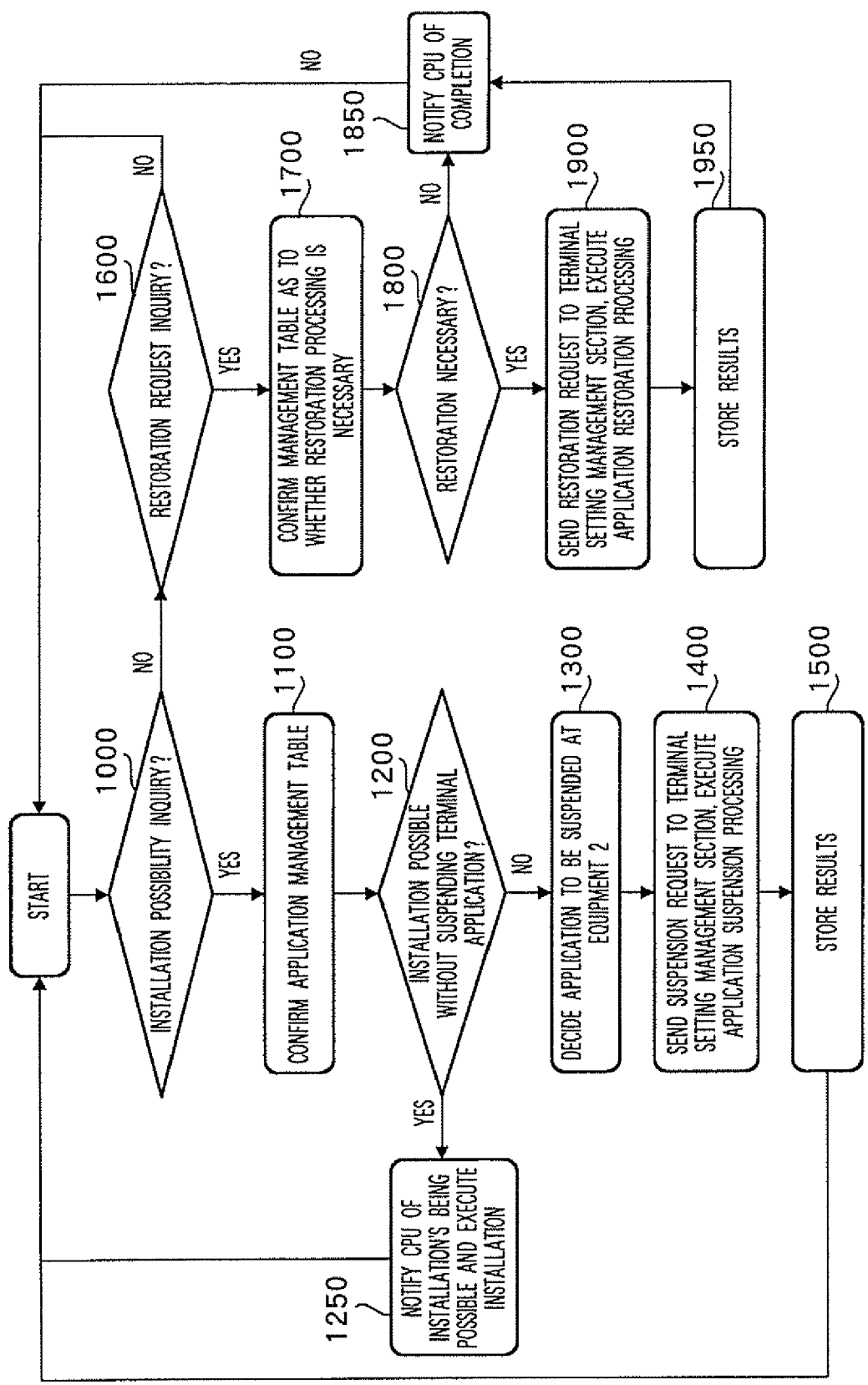
FIG. 37 is a flowchart showing detailed processing occurring in a terminal application suspension management section of Embodiment 8.

A flowchart showing detailed processing occurring in a terminal application suspension management section 120 of Embodiment 8 is shown in FIG. 37.

At terminal application suspension management section 120, first, a determination is made as to whether or not there is an interrogation as to whether or not installation of a terminal application is possible from CPU 12 (step 1000). In the event that installation is possible (step 1000 "YES"), the application management table (not shown) etc. is confirmed (step 1100), and a determination is made as to whether or not installation is possible without suspending the terminal application (step 1200).

For example, the application management table (not shown) etc. is confirmed, and in the event that the maximum number of terminal applications which is possible to store is ten, and there are already ten terminal applications stored, it is determined that a new installation is not possible without interrupting the terminal application. An example may also be considered as an installation possibility inquiry where, for example, terminal application of application ID3 is deleted as possibility inquiry ID1, and two terminal applications of application ID1 and application ID2 are installed.

In the event where it is determined that installation is possible without interrupting the terminal application (step 1200 "YES"), the terminal application suspension management section 120 notifies the CPU 12 that installation is possible, and installation can be executed without interrupting the terminal application (step 1250).

On the other hand, in the event that it is determined that installation is not possible without interrupting the terminal application (step 1200 "NO") terminal application suspension management section 120 first determines the terminal application to be interrupted at the combination card 20 that is equipment 2 (step 1300). For example, the interruption priority table (not shown) of the terminal application etc. is referred to, and it is decided to interrupt the terminal application etc. of the game for the application ID8.

When the terminal application to be interrupted is decided, terminal application suspension management section 120 sends an interrupt request to terminal setting management section 220 of equipment 2, application interruption processing is implemented (step 1400), the interruption results are stored in the management table etc. (step 1500), and the start is returned to. For example, in the event of carrying out interruption processing of the terminal application of the game of application ID8, the interrogation ID1 for whether or not this terminal application is possible, time stamp for the time or interruption, interruption results of OK, interrupted application ID (application ID8), and information for authenticating with equipment 2 etc. are stored in a management table etc.

On the other hand, in step 3700, in the event that it is determined that there is not an interrogation for whether or not installation is possible (step S1000 "NO"), but rather it is determined that there is an interrogation for whether or not restoration is necessary (step 1600 "YES"), whether or not restoration processing is necessary is confirmed with reference to the application management table (not shown) (step 1700).

As the interrogation of whether or not restoration is necessary, for example, because the setting of possibility inquiry ID1 for an inquiry as to whether or not installation is possible is terminated, if restoration processing is necessary, ID2 inquiring the necessity of restoration for execution of restoration processing etc. can be considered. Further, in the event that inquiry processing for the terminal application for the game of the application ID5 is implemented at the possibility inquiry ID1, etc. is disclosed for during confirmation of whether or not restoration processing is necessary by referring to an application management table (not shown) etc., it is determined that restoration processing is necessary.

Here, in the event that restoration is determined not to be necessary (step 1800 "NO"), CPU 12 is notified of completion (step 1850). The start is then returned to, and in the event that restoration is determined to be necessary (step 1800 "YES"), terminal application suspension management section 120 sends a restoration request to terminal setting management section 220 of equipment 2, and implements restoration processing for the terminal application that has been terminated at the second terminal setting management section 220 (step 1900). The results of restoration processing are stored in an application management table (not shown) etc., CPU 12 is notified of these results (step 1950) and the beginning is returned to. Results of restoration processing may be, for example, possibility inquiry ID1, time stamp for the time of interruption, interruption result OK, necessity inquiry ID2, time stamp for the time of restoration, restoration results of OK, interrupted/regenerated application ID (application ID 8), and information for authentication with equipment 2, etc.

According to Embodiment 8, in the event that a new terminal application is installed at the mobile telephone 10 that is equipment 1, in order to guarantee the memory capacity of the mobile telephone 10 that is equipment 1, the terminal application of mobile telephone 10 is interrupted at the combination card 20, the new terminal application is installed at the mobile telephone 10, and in the event that release of the settings of the terminal application newly installed is carried out as a result of timer management etc., as the suspended terminal application was installed at the mobile telephone, it is possible to limit the area where the card application functions and apparatus functions etc. are presented without further increasing the memory capacity of the mobile telephone 10.

As described above, in an aspect of the present invention, an authentication section performing authentication processing for gate equipment, terminal applications installed at a terminal, and a control section installing terminal applications designated by the gate equipment at the terminal in the event that authentication of the authentication section with the gate equipment is successful are provided at a secure device. It is therefore possible for the secure device to be held up to gate equipment and for terminal applications to then be installed to the terminal only for an area passed into in a normal manner. The gate application for the gate equipment is designated to be an application functioning in a specific area. Registration operations of a user etc. are therefore not necessary, and providing of a GPS receiver at the terminal is therefore not necessary.

Moreover, in a further aspect of the present invention, an authentication section performing authentication processing for gate equipment, and a card application are provided at a secure device. In the event that authentication of the authentication section with the gate equipment is successful, a card application designated by the gate equipment is permitted to access a terminal application of the terminal. It is then possible for the terminal device to be held up to the gate equipment, and for the terminal application to utilize the card application only in areas passed into in a normal manner.

In another aspect of the present invention, an authentication section carrying out authentication processing with respect to gate equipment and registering identification information for successfully authenticated gate equipment, and a card application sending the identification information for the gate equipment to equipment carrying out predetermined operations under the condition that the authentication section successfully performs authentication with the gate equipment in order to provide verification of the equipment, and verifying the identification information in place of the equipment are provided at the security device. It is therefore possible to ensure that equipment does not operate if entering does not take place from the appropriate entrance where the gate equipment is installed.

Further, in a further aspect of the present invention, the security device sets terminal applications to be installed at a terminal or deleted from a terminal according to the communication scheme with the gate equipment. It is therefore possible to change the terminal application etc. installed at the terminal readily according to the communication scheme and security can therefore be ensured readily.

In a still further aspect of the present invention, the secure device determines whether or not settings with the terminal that were valid for the previous time have been correctly invalidated during authentication with the gate equipment, with authentication with the gate equipment then only being permitted in the event of correct invalidation. It is therefore possible to permit authentication with the gate equipment for this time based on whether or not invalidation processing for the previous time has been carried out correctly, and it is therefore possible to ensure greater security.

In a yet further aspect of the present invention, the secure device sets validity or invalidity of card applications according to the communication scheme with the gate equipment. It is therefore possible to ensure security readily according to the communication scheme.

In another aspect of the present invention, a communication section communicating with a secure device or a terminal holding the secure device and a gate application carrying out authentication processing with the secure device via the communication section, and designating a terminal application to be installed at the terminal for the successfully authenticated secure device, or a communication section communicating with a secure device or a terminal holding the secure device and an application carrying out authentication processing with the secure device via the communication section, and designating a card application that the terminal application of the terminal is capable of accessing for the successfully authenticated secure device, are provided at gate equipment. It is therefore possible to designate terminal applications to be installed at the terminal or card applications capable of being accessed by the terminal applications for secure devices for which authentication is successful.

In a further aspect of the present invention, the terminal apparatus holds a secure device, and installs a terminal application designated by the gate equipment from the secure device successfully authenticated with gate equipment, or the terminal apparatus holds a terminal device and is provided with a terminal application accessing a card application designated by gate equipment during a card application held by the secure device successfully authenticated with the gate equipment. It is therefore possible to have special functions of the terminal apparatus operation only in specific areas where gate equipment is arranged at an entrance.

In a further aspect of the present invention, in the event that a terminal application cannot be installed due to there being too little memory capacity at the time of receiving an install request for a new terminal application from the security device, the terminal apparatus installs the new terminal application from suspending a held terminal application in the secure device, then deletes the installed new terminal application, and regenerates the saved terminal application. It is therefore possible to implement anew terminal application even in cases where the memory capacity for suspending the terminal application is small.

In a further aspect of the present invention, equipment acquires identification information for gate equipment from a secure device successfully authenticated with the gate equipment and carries out predetermined operations in the event that authentication of this identification information is successful, or equipment carries out predetermined operations in the event that information indicating successful authentication of identification information of the gate equipment is acquired from a secure device that has been successfully authenticated with the gate equipment. It is therefore possible to ensure that the equipment does not operate if the user in possession of the secure device does not enter from the appropriate entrance.

This present application is based on Japanese Patent Application No. 2004-19461, filed on Jan. 28, 2004, the entire content of which is expressly incorporated by reference herein.

INDUSTRIAL APPLICABILITY

The present invention can be utilized in cases of changing functions of each type of secure device, and the functions of each type of terminal, apparatus, and equipment etc. in connection with location, path, position, communication scheme, invalidation processing for the previous time, and memory capacity etc., and is capable of being utilized in various fields such as in offices, homes, medical locations, and places of learning, etc.

The invention claimed is:

1. A secure device, comprising:
a receiver that receives information, including terminal application identification information that identifies a terminal application, from a gate equipment when the secure device enters a range of communication of the gate equipment;
an authenticator that performs authentication processing with the gate equipment according to a processing request from the gate equipment, and outputs a response for the gate equipment to a transmitter;
a holder that holds the terminal application, the terminal application corresponding to the terminal application identification information;
controller that outputs a request for installation of the terminal application to the transmitter when authentication between the authenticator and the gate equipment is successful, wherein the transmitter transmits the response to the gate equipment, transmits the request for installation to a terminal and transmits the terminal application to the terminal when the secure device enters the range of communication of the gate equipment.

2. The secure device according to claim 1, wherein the controller provides the terminal application installed at or deleted from the terminal according to a communication scheme with the gate equipment.

3. The secure device according to claim 1, further comprising a terminal setting management section that determines whether or not a setting to validate for a previous time with the terminal has been correctly invalidated while the authenticator is performing authentication with the gate equipment, and permits authentication with the gate equipment only in the event of correct invalidation.

4. A gate equipment comprising:
a communicator that communicates with one of the secure device according to claim 1 and a terminal holding the secure device, and transmits a request for installation, to the secure device when the secure device enters the range of communication of the gate equipment;
an authenticator that transmits a processing request to the secure device, via the communicator, and performs authentication processing with the secure device; and
a controller that outputs a request for installation of a terminal application to the communicator to transmit to the successfully authenticated secure device, the terminal application including terminal application identification information for identifying a terminal application to be installed at a terminal, and transmits the request for installation to the secure device, via the communicator.

5. A terminal apparatus, comprising:
a holder that holds the secure device according to claim 1;
a receiver that receives a request for installation including terminal application identification information from the secure device successfully authenticated with the gate equipment, the gate equipment being located outside the terminal of the secure device;
a transmitter that is used to transmit information for authentication with the gate equipment; and
an installer that installs a terminal application corresponding to the terminal application identification information, wherein an authentication operation with the gate equipment is enabled when the secure device enters the range of communication of the gate equipment.

6. The terminal apparatus according to claim 5, further comprising a terminal application suspension manager that, in the event that a new terminal application cannot be installed due to an insufficient memory capacity when an installation request for the new terminal application is received from the secure device, installs the new terminal application after suspending and saving a held terminal application in the secure device, then deletes the installed new terminal application, and restores the saved terminal application.

7. The terminal apparatus according to claim 5, wherein the secure device is installed in a detachable state.

8. The terminal apparatus according to claim 5, wherein the secure device is embedded in an integral manner.

9. A secure device comprising:
an authenticator that performs authentication processing with a gate equipment according to a processing request from the gate equipment, and outputs a response for the gate equipment;
a holder that holds a terminal application, and holds correspondence information defining a correspondence relationship of between the gate equipment and the terminal application;
a controller that outputs a request for installation of the terminal application only when the relationship between the terminal application designated by the gate equipment and the gate equipment matches with the correspondence information;
a receiver that receives the processing request from the gate equipment when the secure device enters a range of communication of the gate equipment; and
a transmitter that processes a transmission request, and transmits the terminal application to a terminal when the secure device enters the range of communication of the gate equipment.

10. A secure device, comprising:
a receiver that receives information including card application identification information for identifying a card application, from a gate equipment when the secure device enters a range of communication of the gate equipment;
an authenticator that performs authentication processing with the gate equipment according to a processing request from the gate equipment, and outputs a response for the gate equipment to a transmitter;
a holder that holds the card application, the card application corresponding to the card application identification information;
a controller that controls the card application designated by the gate equipment so as to permit an access from a terminal application of a terminal to the card application in the event of successful authentication of the authenticator with the gate equipment; and
the transmitter transmits the response to the gate equipment and transmits permission of access by the terminal application to the terminal when the security device enters the range of the gate equipment.

11. The secure device according to claim 10, wherein the authenticator has a database having information comprising a relationship between successfully authenticated gate equipment and the card application designated by the gate equipment, and the card application determines whether to permit or deny access based on the information of the database when there is an access request from the terminal application.

12. The secure device according to claim 10, wherein the controller sets the card application to valid or use inhibited according to a communication scheme with the gate equipment.

13. A gate equipment, comprising:
a communicator that communicates with one of the secure device according to claim 10 and a terminal holding the secure device, and transmits information including card application identification information for identifying a card application to the secure device when the secure device enters the range of communication of the gate equipment;
an authenticator that transmits a processing request to the secure device, via the communicator, and performs authentication processing with the secure device; and
a controller that transmits information including the card application identification information to the successfully authenticated secure device, via the communicator, and controls a card application designated by the card application identification information so as to permit an access from a terminal application of the terminal to the card application.

14. A secure device, comprising:
a receiver that receives information including card application identification information that identifies a card application, from a gate equipment when the secure device enters a range of communication of the gate equipment, the gate equipment being located outside the secure device;
an authenticator that performs authentication processing with the gate equipment according to a processing request from the gate equipment, registers identification information for successfully authenticated gate equipment, and outputs a response for the gate equipment to a transmitter;
a holder that holds the card application, the card application corresponding to the card application identification information;
a controller that, for another equipment carrying out a predetermined operation, makes the card application verify a correspondence relationship between the identification information for the gate equipment and the card application identification information when the authenticator successfully performs authentication with the gate equipment, and controls the card application so as to permit an access by a terminal application of the equipment carrying out the predetermined operation in the event of a successful authentication result; and
a transmitter that transmits the response to the gate equipment and transmits permission of access by the terminal application to the equipment carrying out the predetermined operation when the secure device enters the range of communication of the gate equipment.

15. The secure device according to claim 14, wherein, for the other equipment, the card application receives input user identification information from the other equipment, and verifies the user identification information in place of the other equipment.

16. A terminal apparatus, comprising:
a holder that holds the secure device according to claim 14;
a transmitter that transmits card application identification information and a request to access a card application to the secure device; and
an accessor that comprises a terminal application that accesses a card application when the card application corresponding to the card application identification information is the same card application that is designated by the gate equipment from among a plurality of card applications held by the secure device that has been successfully authenticated with the gate equipment, wherein an authentication operation with the gate equipment is enabled when the secure device enters the range of communication of the gate equipment.

* * * * *